United States Patent
Walter et al.

[11] Patent Number: 5,997,670
[45] Date of Patent: Dec. 7, 1999

[54] METHOD AND APPARATUS FOR APPLYING SELF-ADHESIVE PROTECTIVE SHEETING TO VEHICLE BODIES

[75] Inventors: Wolfram Walter, Neuhausen; Uwe Habisreitinger, Freudenstadt; Thomas Link, Nagold; Bernhard Nordmann, Boeblingen; Fritz Starzmann, Bad Liebenzell, all of Germany

[73] Assignee: DaimlerChrysler AG, Germany

[21] Appl. No.: 08/953,379

[22] Filed: Oct. 17, 1997

[30] Foreign Application Priority Data

Oct. 17, 1996 [DE] Germany ............................ 196 42 831
Apr. 30, 1997 [DE] Germany ............................ 197 18 204

[51] Int. Cl.⁶ .............................. B32B 31/00; B60J 11/00
[52] U.S. Cl. ........................... 156/71; 156/212; 156/229; 156/252; 156/256; 156/486; 156/494; 150/166; 280/770; 280/848
[58] Field of Search .............................. 156/71, 229, 252, 156/256, 486, 494, 514, 212; 150/166; 296/136; 280/152.3, 154, 848, 770; 206/335

[56] References Cited

U.S. PATENT DOCUMENTS

| | | | |
|---|---|---|---|
| 4,635,996 | 1/1987 | Hirose | 296/136 |
| 5,127,974 | 7/1992 | Tomiyama et al. | 156/344 X |
| 5,280,989 | 1/1994 | Castillo | 296/136 |
| 5,294,278 | 3/1994 | Matsui et al. | 156/248 |
| 5,601,917 | 2/1997 | Matsui et al. | 428/356 |
| 5,747,132 | 5/1998 | Matsui et al. | 156/344 X |
| 5,820,201 | 10/1998 | Jabalee | 296/136 |

FOREIGN PATENT DOCUMENTS

| | | |
|---|---|---|
| 43 06 016 A1 | 9/1993 | Germany . |
| 42 34 712 A1 | 4/1994 | Germany . |
| 6-156339 | 6/1994 | Japan . |
| 6-254451 | 9/1994 | Japan . |
| 6-255873 | 9/1994 | Japan . |
| 7-90235 | 4/1995 | Japan . |
| 07237569 | 9/1995 | Japan . |

*Primary Examiner*—Mark A. Osele
*Attorney, Agent, or Firm*—Evenson, McKeown, Edwards & Lenahan P.L.L.C.

[57] ABSTRACT

In a method and apparatus for automatically applying self-adhesive protective sheeting to surface parts of vehicle bodies, a specific rectangular piece of protective sheeting in the form of stock roll is grasped on its non-adhesive side, using a robot-controlled tentering frame with suction legs, is drawn off and is cut off. Before the sheeting blank is laid on to the body, in the freely stretched-out state tear-off lines are perforated, preferably from the non-adhesive sheeting side, in the region of accessory parts by means of a perforating device guided along definite contour lines. Thereafter the protective sheeting, which is thus prepared and stretched out so as to be free of creases in the tentering frame, is lowered in the correct position onto the associated part by the handling robot and laid onto the surface part so as to be free of bubbles. The sheetings are subsequently pressed down in a brushing manner under an elastic brushing bar extending over the entire vehicle width. In the region of glued-over gaps in the vehicle body surface, the protective sheeting is severed and the cut edges are pressed down. In the region of accessory parts, protective sheeting parts are drawn off along the perforated tearing lines and openings are thus made in said regions in a manner appropriate for assembly.

20 Claims, 13 Drawing Sheets

METHOD AND APPARATUS FOR APPLYING SELF-ADHESIVE PROTECTIVE SHEETING TO VEHICLE BODIES

BACKGROUND AND SUMMARY OF THE INVENTION

This application claims the priority of German Application No. 196 42 831.9, filed Oct. 17, 1996 and German Application No. 197 18 204.6, filed Apr. 30, 1997, the disclosures of which are expressly incorporated by reference herein.

The invention relates to a method and an apparatus for applying self-adhesive protective sheeting to vehicle bodies.

In the mass production operation of many vehicle manufacturers, the vehicles have to be prepared for dispatch in such a way that they incur no damage, in particular in such a way that the paintwork is not adversely affected by storage and atmospheric influences. If rail travel or even transport by ship became necessary for transfer to the customer, the vehicles were covered for this purpose with a protective wax layer which had to be removed again before delivery to the customer. The complete removal of the protective wax was not only labour-intensive work, but also caused pollution for humans and for the environment on account of the solvents which were used at the same time.

There has therefore recently been a tendency to protect the bodies during transport by means of self-adhesive sheetings, although only the essentially horizontal surface parts of the body which are at risk from atmospheric influences and precipitation have been protected in this way. Since this type of protection is not only highly effective, but also relatively expensive, it was provided not only as protection during transport, but also as protection during vehicle assembly, and the protective sheeting was therefore applied even before the final assembly of the vehicle, that is to say immediately after the painting of the body. Such protection is advantageous not only for conventional saloon cars of hatchback design, but also for all possible vehicles, such as, for example, estate cars, small buses, so-called large-capacity saloons or cross-country vehicles.

The protective sheeting is to be applied so as to be as free of creases and bubbles as possible, because a microclimate may form under creases or bubbles after a certain amount of storage time, and this microclimate may, under some circumstances, lead to visible traces, depending on the type and colour of the paint. So that protective sheetings can be applied with great care, the sheeting blanks have hitherto had to be held by four persons, brought over the vehicle, aligned and laid onto the associated surface parts. Despite the large amount of manpower, it was not always possible to avoid creases or bubbles when the protective sheeting was being applied. When the regions for accessory parts were subsequently cut free, damage to the paintwork often occurred, so that complicated reworking became necessary.

The following procedure has hitherto been adopted for the manual application of the protective sheeting: in the first place, a rectangular piece of protective sheeting coordinated in terms of size with a surface part was drawn off by at least two persons from a stock roll and was cut off, and it had to be received by four persons altogether. This piece of protective sheeting was stretched out freely, with a self-adhesive side facing downwards, by the four persons with their bare hands, brought in this way over the body, lowered in the correct horizontal position onto the associated surface part, laid onto it so as to be more or less free of creases and bubbles and pressed down by brushing with a soft slideable article, for example a piece of stiffened felt. In the region of glued-over gaps with adjacent body parts, such as mudguards or doors, protective sheeting was cut through manually with a knife and the cut edges pressed down by hand.

So that the protective sheeting could be cut free and clearances made in it in a manner appropriate for assembly in the region of accessory parts, such as roof trim bars, sliding-roof covers, radiator cowlings, screen-washing nozzles, aerials, screen frames or the like, previously a flat strip-shaped stencil was applied to the body in the correct position during the manual application of the sheeting and the protective sheeting to be applied was likewise glued over the stencil, so that the sheeting was not only held at a short distance from the body surface on the regions to be cut free, but the stencil also formed a cutting and guiding edge for a knife, along which edge the sheeting could be severed in a manner appropriate to the contour. At the hectic pace adopted, despite constant practice, working with a sharp-edged knife very close to the painted body surface repeatedly resulted in paint damage and in complicated reworking.

This state of the art corresponds to manufacturing practice, at least where the applicant is concerned; since, for reasons of environmental protection, the USA no longer allows protective waxings in vehicle dispatch, it is likely that other vehicle manufacturers too have also changed to a similar protective sheeting system for their vehicles during dispatch. However, the applicant does not know of any publication relating to this.

Proceeding from this state of the art, the object of the invention is to improve the application method and the corresponding apparatus to the effect that monotonous manual work can be replaced by mechanization, the quality of application as regards the freedom of the applied protective sheeting from bubbles and creases as well as the avoidance of paint damage can be improved, and, moreover, labour costs can be saved.

According to the invention, this object is achieved by mechanizing the application of sheeting to the body. A specific rectangular piece of a protective sheeting from a stock roll is grasped on the non-adhesive side by using a robot-controlled tentering frame, preferably with suction legs. The piece is drawn off from the stock roll and is cut off. Before the sheeting blank is laid onto the body, perforated tear-off lines are made in the region of accessory parts by means of a perforating tool while the sheeting blank is in the freely stretched-out state. (For example, the protective sheeting is perforated from its non-adhesive side by means of a heated serrated disk guided mechanically along defined contour lines.) Thereafter, the protective sheeting, thus prepared, is stretched out so as to be free of creases in the tentering frame, lowered in the correct position onto the associated surface part by the handling robot, laid on so as to be free of bubbles and pressed down by means of a brushing bar. All the surface parts are thereby glued over in succession. In the region of accessory parts, protective sheeting parts are drawn off along the perforated tearing lines and clearances are thus made in the regions in a manner appropriate for assembly.

In an expedient embodiment of the invention, the initially loosely applied sheetings are all pressed down jointly. In the region of glued-over gaps, the protective sheeting is severed and the cut edges are expediently pressed down by means of a rotating brush in the gap region.

Other objects, advantages and novel features of the present invention will become apparent from the following detailed description of the invention when considered in conjunction with the accompanying drawings.

DETAILED DESCRIPTION OF THE DRAWINGS:

Before the apparatus for the automated gluing of the vehicle body with sheeting is dealt with in particular, the method according to the invention for the application of sheeting will first be described in more detail with reference to the drawings.

Figure 3:
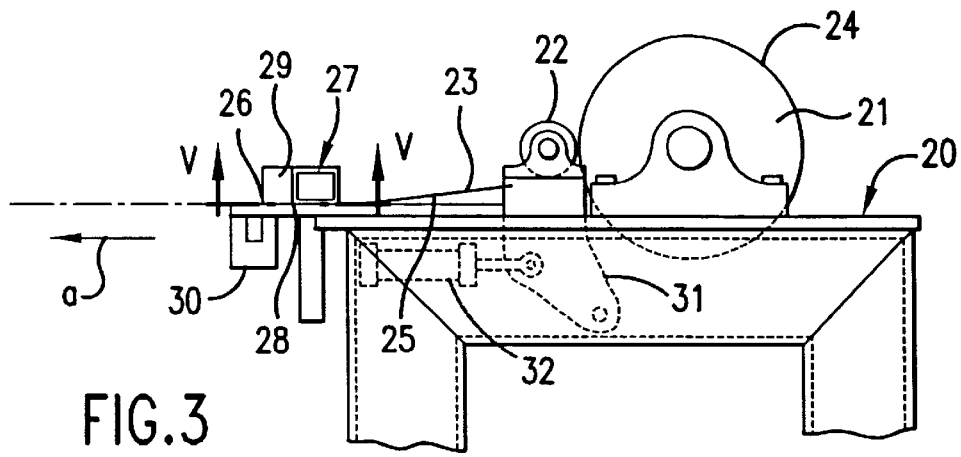
FIGS. 3 and 4 show respectively a side view (FIG. 3) and a top view (FIG. 4) of an apparatus for the on-demand provision and drawing-off of protective sheeting from the stock roll.

The self-adhesive protective sheeting 23 provided in stock rolls 21 (FIG. 3) is applied in an automated manner to specific, preferably the horizontal, surface parts of passenger car bodies 1 in the conventional hatchback version. It is basically possible to apply the protective sheeting to the ready-assembled vehicle or, even at any other time during the final assembly of the vehicle, to the body. However, as early as during assembly, the applied protective sheeting affords some protection of the paintwork against damage caused during assembly, according to the exemplary embodiment illustrated the protective sheeting is applied to the freshly painted bodies 1 which subsequently run, together with the protective sheeting, into the final assembly stage. Gluing sheeting over the side faces of doors, preferably of the front doors and, in particular, the driver's door which are used particularly frequently during assembly, is also advantageous. Whether the protective sheeting is applied before, during or after assembly, at all events clearances must be made in the sheeting at the locations of accessory parts in a manner appropriate for assembly.

Figure 10:
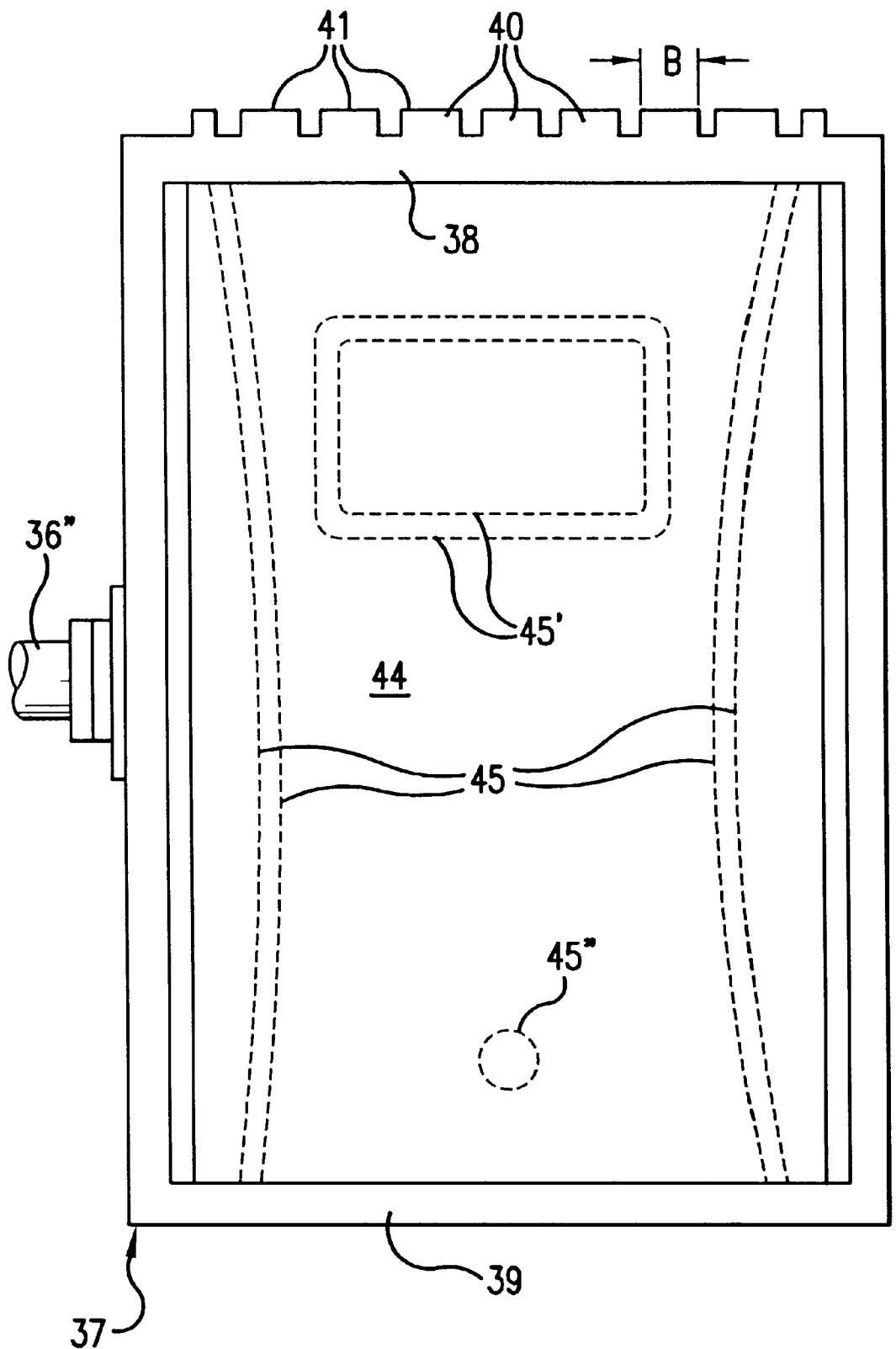
FIG. 10 shows the sheeting blank stretched out in the tentering frame and having various perforation lines drawn into it.

For the automated application of the sheeting, a metered sheeting piece 44 is drawn off from the sheeting stock by a robot-controlled tentering frame 37 (FIG. 1) and is received into the tentering frame so as to be free of creases and with some inherent tension (FIG. 10). In the stretched-out sheeting blank (which can handled almost in the same way as a rigid workpiece on account of the tentering frame) perforation lines are made in the correct position, before the application of the sheeting, by means of a likewise robot-controlled perforating tool. The said perforation lines allow the assembly-related removal of specific sheeting regions by tearing off along the perforation lines. Only thereafter is the sheeting blank, having the perforation lines, lowered in the correct position onto the associated surface part of the body by the tentering-frame robot and pressed down onto the said surface part so as to be free of creases and bubbles.

Figure 6:
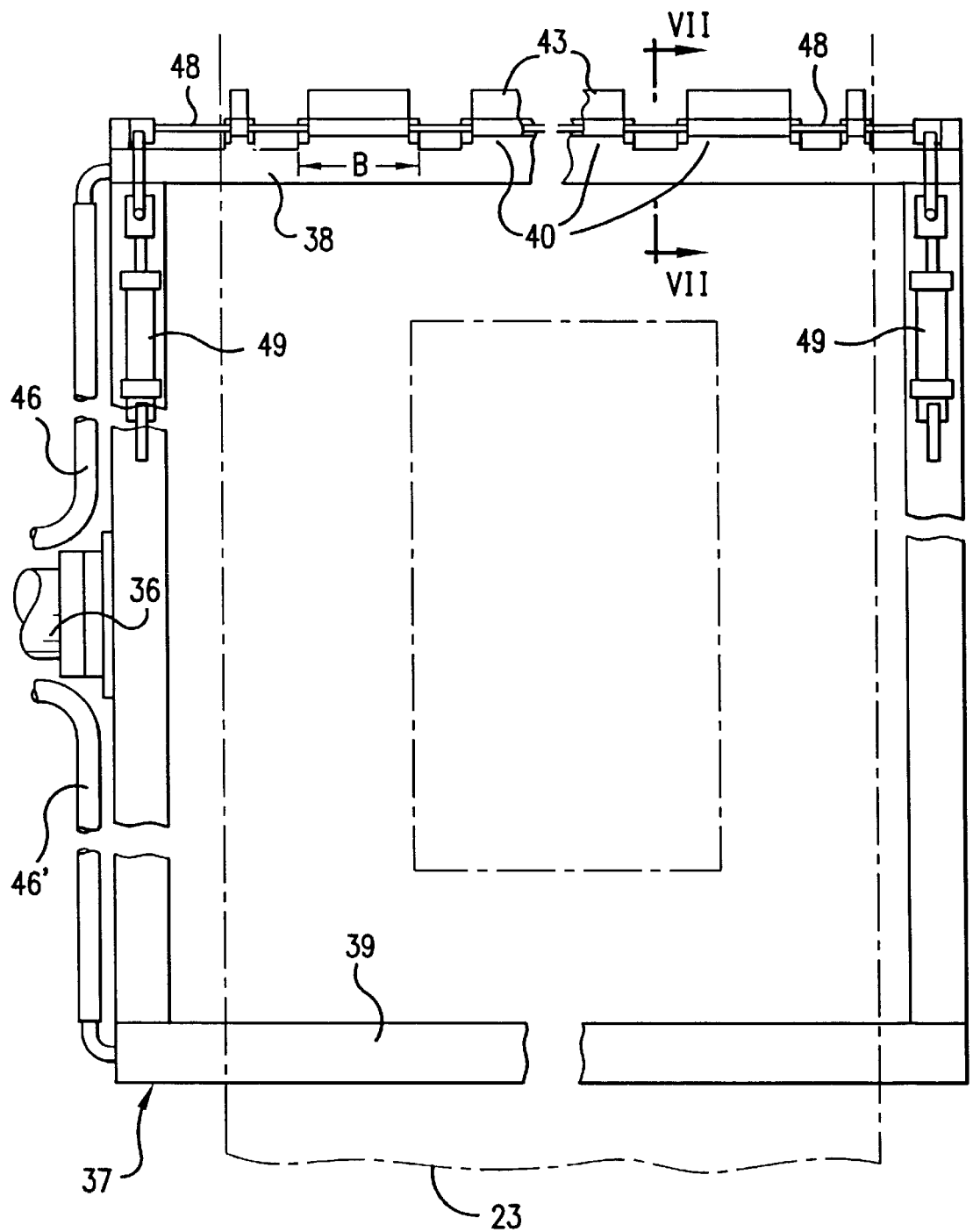
FIG. 6 shows a robot-controlled tentering frame for the automated handling of the sheeting blank cut off from the stock.
Figure 7:
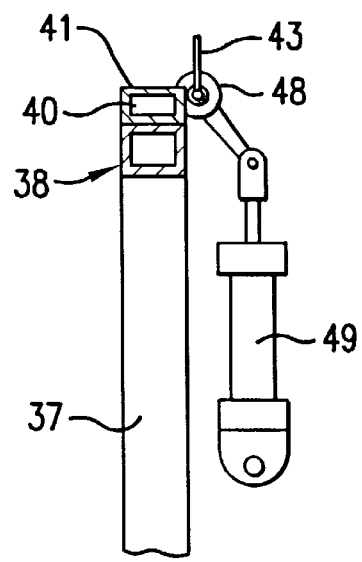
FIG. 7 shows a cross-section through the leading suction bar of the tentering frame according to FIG. 6 along the sectional line VII—VII, showing additional gripping elements.
Figure 8:
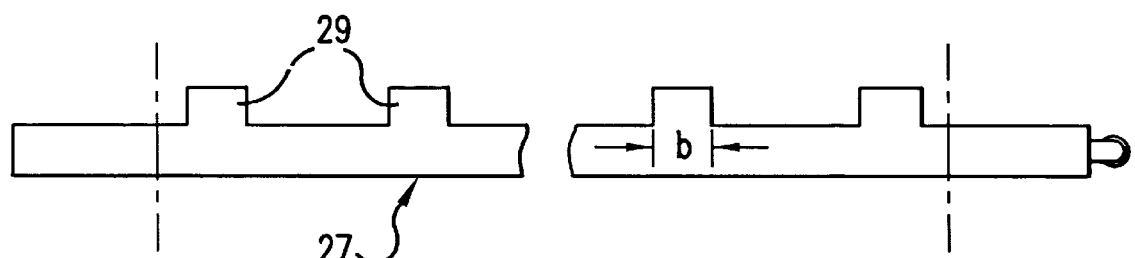
FIG. 8 shows the suction bar of the unrolling apparatus for the retention of the leading sheeting end in the correct position opposite the leading suction bar of the tentering frame according to FIG. 6.

In particular, the following method steps are provided: the leading end of the protective sheeting 23 coming from the stock roll 21, is retained and provided in a specific position and so as to be free of creases, in such a way that the sheeting end 26 is accessible, at least in regions, on the non-adhesive side 24. During the draw-off, the protective sheeting 23 is constantly treated anti-statically in a freely stretched-out strand, so that the sheeting blanks can subsequently be laid onto the body surface in a fault-free manner even right into the edge region. The said stock-side end of the protective sheeting is received on its non-adhesive side by the first suction bar 38 (FIGS. 6, 10), located on the tentering frame and guided in the drawing-off direction a by the tentering frame robot, after the sheeting has been released from the provision holding device.

A rectangular piece of protective sheeting, coordinated in terms of size (with a surplus portion), is then drawn from the stock roll 21 and stretched out, as long as the drawn-off sheeting piece is still adhering to the stock. A trailing second suction bar 39 of the tentering frame 37 is set down onto the non-adhesive side of the stretched-out protective sheeting and, there too, retains the sheeting by means of a switched-on vacuum. The drawn-off sheeting piece is thereby stretched in a tentering frame and, at the same time, a new stock-side sheeting end is retained once again on the provision holding device. Despite differing adhesion of the sheeting layers of the roll to one another and despite different roll diameters, suitable design measures for the unwinding of the protective sheeting ensure that the protective sheeting is drawn off from the stock roll and received into the tentering frame with uniform tension. A transversely running knife cuts off the drawn-off sheeting piece, already retained in the tentering frame, from the stock.

The tentering-frame robot 35 (FIGS. 1, 2) holds out the now freely moveable sheeting blank 44 in a specific position, in a manner appropriate for work, to the perforating robot 50 (FIG. 2) which perforates the necessary tear-off lines 45, 45', 45" (FIG. 10) in the freely-stretched out sheeting, from the non-adhesive side, by means of a suitable perforating tool. Various known perforation methods and different tools may be used for this purpose. For example, purely mechanical perforation having a cutting effect can be used here, for which purpose, in the manner of the serrated wheel described further below, a rotatable knife wheel having a plurality of radially projecting, pointed and sharp knife blades would be necessary as an essential part of a perforating tool. On the other hand, purely thermally active, contactless perforation by means of a focused laser beam, which would presuppose a corresponding laser head as a perforating tool, is also possible. In the exemplary embodiment illustrated, a combination of mechanical and thermal perforation is selected, and a heated serrated disk 55 or a heated crown-like perforating punch is provided in the perforating tool. In mechanical perforation, it is necessary to work from the non-adhesive side. If perforation is carried out contactlessly by means of a laser beam, it is also possible to work from the adhesive side.

For the sake of completeness, it may also be mentioned that it is also possible perforate of the sheeting piece, received in the tentering frame, in a kinematically reversed manner, which could make an additional perforating robot unnecessary. In particular, if this procedure were adopted, the tentering-frame robot would guide the sheeting along a fixedly held perforating device in accordance with the desired profile of the perforation lines. In this case, different perforating devices could be brought into the operative position successively, depending on the need for a single line, double line, small-format closed contour. Despite the fact that there is no need for an additional perforating robot for each tentering-frame robot, this mode of operation is disadvantageous in various respects. The tentering-frame robot has to execute wide-ranging movements together with the tentering frame which is, in any case, bulky and heavy. It would therefore be necessary to use a tentering-frame robot which can tolerate higher mechanical load than is necessary in the mode of operation described further above and which, moreover, can cover a larger working volume. The cost benefits are thereby partially offset. Furthermore, the cycle time during the perforating operation is adversely affected on account of the handling of the heavy tentering frame, as compared with the handling of the essentially lighter perforating device. In addition, under some circumstances there is no space available for the unimpeded handling of the bulky tentering frame when the perforation lines are being made. Although instances of use, in which the said disadvantages have no bearing and the last-described mode of handling during perforation is expedient, are readily conceivable, this alternative is not illustrated in the drawing.

Figure 9:
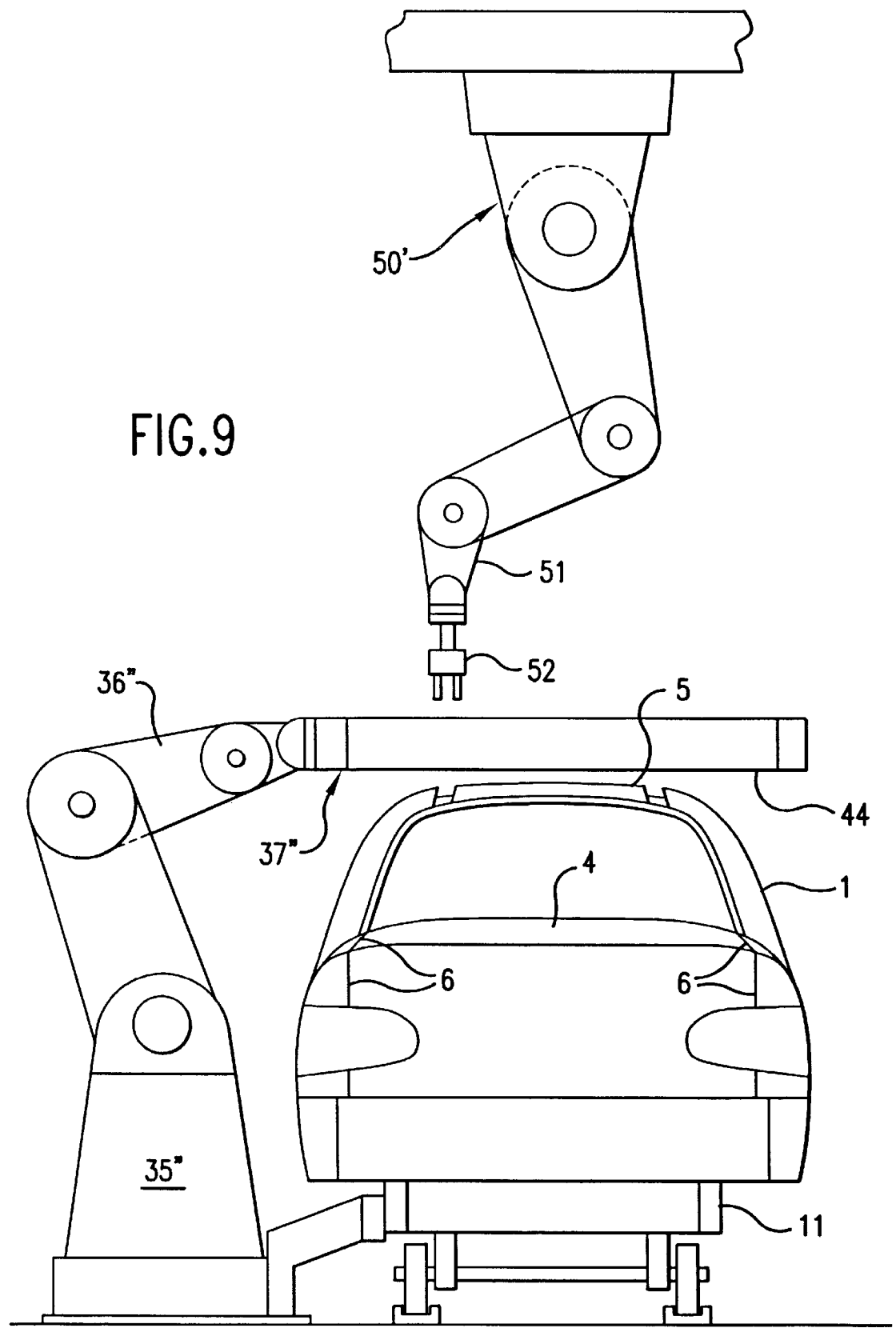
FIG. 9 shows a longitudinal view of the station for gluing the roof with sheeting, at the stage where the sheeting blank provided, stretched out, in the tentering frame, is processed by the suspended perforating robot.
Figure 15:
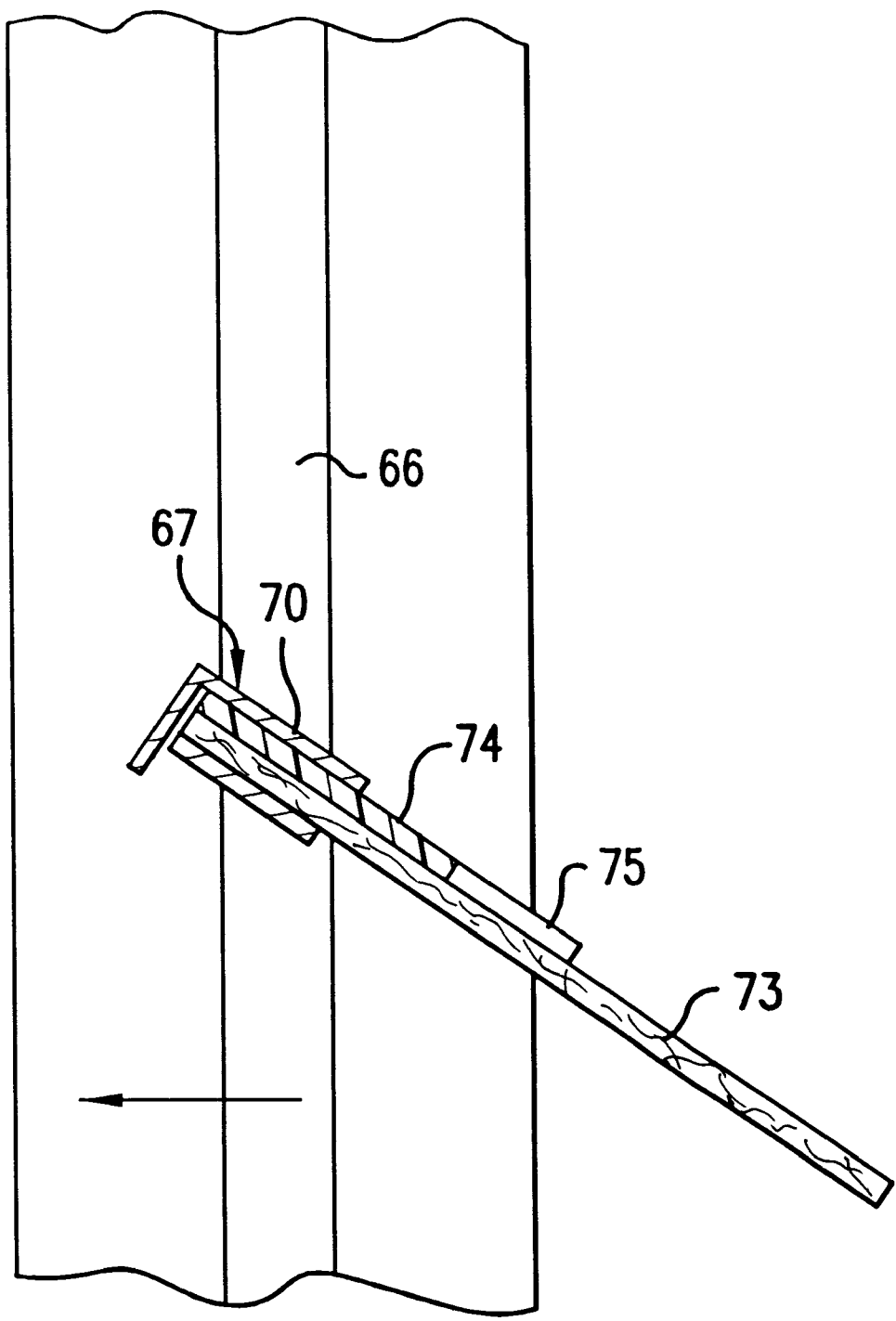
FIG. 15 shows a cross-section through the brushing bar of the gantry according to FIG. 14 along the sectional line XV—XV.

The perforated sheeting blank is subsequently aligned by the tentering-frame robot 35 relative to the associated surface part 3, 4, 5 of the body 1 (FIG. 9) provided in a specific position. It is then lowered and laid onto the surface part in the stretched-out and perforated state. When the sheeting is being laid onto the curved body surface, the tension of the sheeting blank retained at the edge is increased as a result of the laying-on operation. So that the sheeting blank does not tear at the perforation lines, the edge chucking is reduced to a lower value in this transfer phase, so that the sheeting edge can slide out of the edge chucking, with lower tensile stress occurring in the sheeting blank. The protective sheeting is subsequently pressed down by means of a slideable and elastic brushing bar 67 (FIG. 15). Expediently, first all the surface parts to be protected are loosely glued with protective sheeting and subsequently all the sheeting portions are pressed down in one and the same operation.

Figure 16:
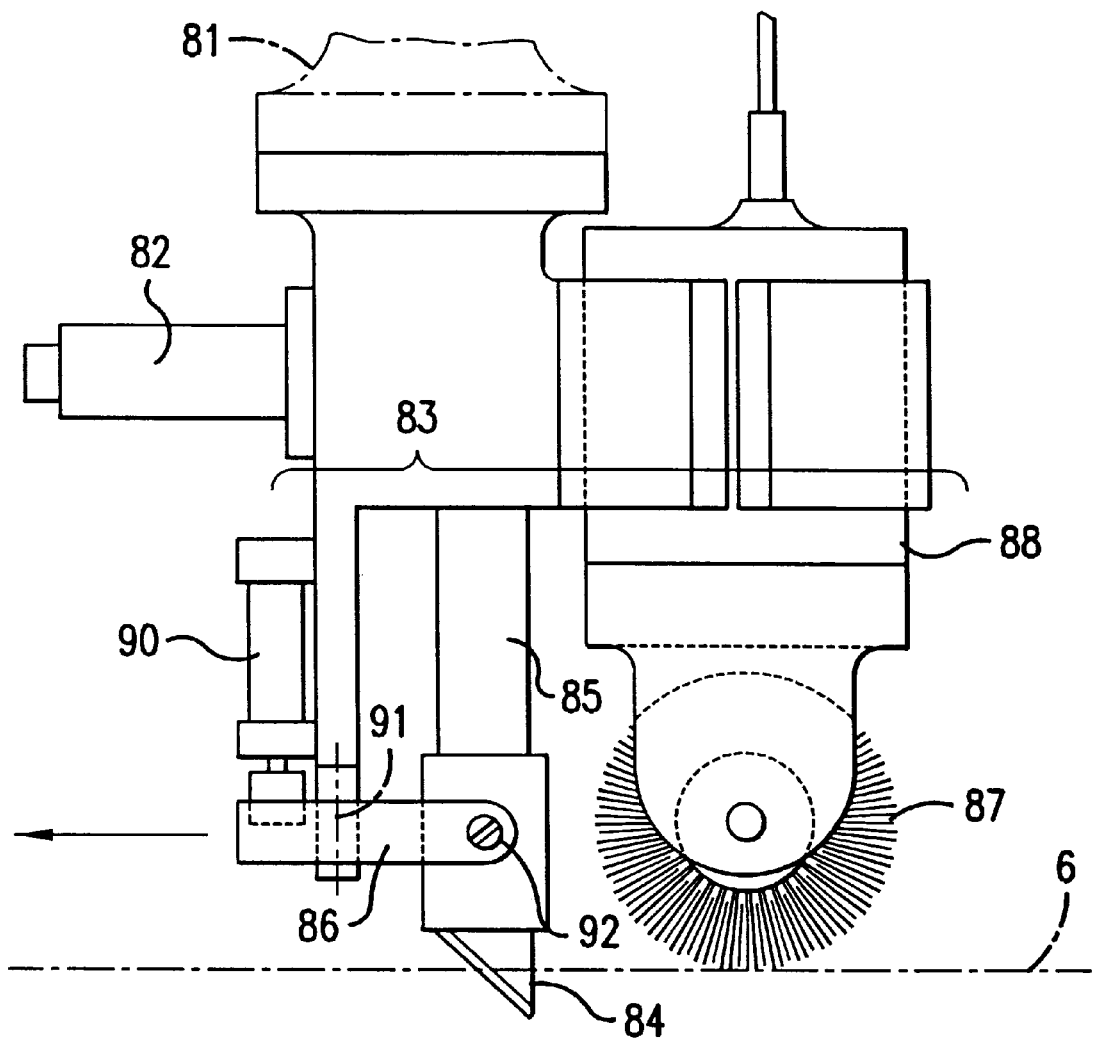
FIG. 16 shows a side view of a robot-controlled double tool for position measurement and for cutting free at gaps as well as for pressing down the edges of the protective sheeting.

In the region of glued-over gaps 6 (FIG. 9), the sheeting can be severed by means of a robot-controlled knife, in the exemplary embodiment illustrated the cut edges being pressed down by means of a rotating brush 87 (FIG. 16). The protective sheeting parts which are located in the region of accessory parts and which cause obstruction during subsequent assembly are drawn off, preferably manually, along the perforated tearing lines.

The sheeting pieces to be removed may also be torn off automatically. For this purpose the tentering-frame robots are expediently used, since these have just applied a specific sheeting piece to a body and, in any case, are located, together with the tentering frame, in the immediate vicinity of the body. The front and/or rear edge of the protective sheeting, adjacent to the window cutout of the windscreen or of the rear window usually has to be shaped according to the contour. For this reason, the sheeting is also perforated along this boundary edge and the projecting length is torn off along this line.

In the instances in which the sheeting piece is gripped by the suction bar at the boundaries parallel to the window cutout, the tentering frame is, in any case, already retaining the projecting length of the sheetings which are to be torn off. In this case, the projecting length may be torn off by means of a suitable obliquely downward-tilting movement of the suction bar or tentering frame. In order to optimize such movement empirically, it is executed by maintaining the vacuum on the suction bar or (in so far as it had been reduced so as to allow the sheeting edge to slide down when the sheeting was being laid on) even by increasing the vacuum to the original value again. The torn-off residual piece still adhering to the suction bar is then blown off into a waste container.

It is also conceivable for individual cutouts initially not retained by the suction bar to be torn off from the sheeting along perforated tear-off lines automatically. For this purpose, for example, specifically shaped suckers capable of being subjected to vacuum, may be integrated pivotably on the tentering frame. After the sheeting has been applied, these may be lowered in a controlled manner onto the sheeting pieces to be torn off which are retained by means of a vacuum. When the tentering frame is lifted off from the body, the firmly sucked sheeting pieces to be removed are then detached positively from the applied sheeting along the previously perforated tear-off lines and are drawn off from the body. When the tentering frame is lifted off from the body, it can then execute an empirically established optimum movement for the tearing-off operation. The tearing-off operation is performed reliably, and is completed in a fault-free manner. In the fully automated mode, the torn-out residual piece of sheeting still retained by the sucker must then be carried by means of the tentering-frame robot over a waste container and blown off into it.

With a view to a simple and complete removal of the protective sheeting after use (that is to say when the vehicle is delivered to the customer), the property of adhesion of the adhesive side 25 of the protective sheeting is deliberately designed to be lower than that of normal adhesive strips in packaging technology. However, so that the protective sheeting does not come loose as a result of the relative wind during travel (test runs and short transfer runs of the vehicle while the sheeting is detached) those edges of the protective sheeting which are located at the front in the direction of travel are secured separately by means of a transverse adhesive strip of higher adhesiveness. These securing strips are affixed in one of the downstream manual workstations 17 after the complete application of the protective sheeting. In the instances in which the sheeting blank has to be secured to the body at the longitudinal edges of the protective sheeting by means of a securing strip, for example when doors are glued with sheeting, it is also conceivable to bring this securing strip together with the protective sheeting immediately on the roll stand and handle and apply this composite sheeting structure jointly. It is also possible for the adhesive securing strip to be affixed in an automated manner by means of a further application robot.

After a large amount of protective sheeting is consumed during the standard covering of vehicle bodies with sheeting, it is expedient to provide an automatic roll change in the roll stands for the protective sheeting and/or to give the stock rolls such large dimensions (that is, wind up so much protective sheeting in each stock roll), that one stock roll is sufficient for the demand of one complete work shift.

Figure 1:
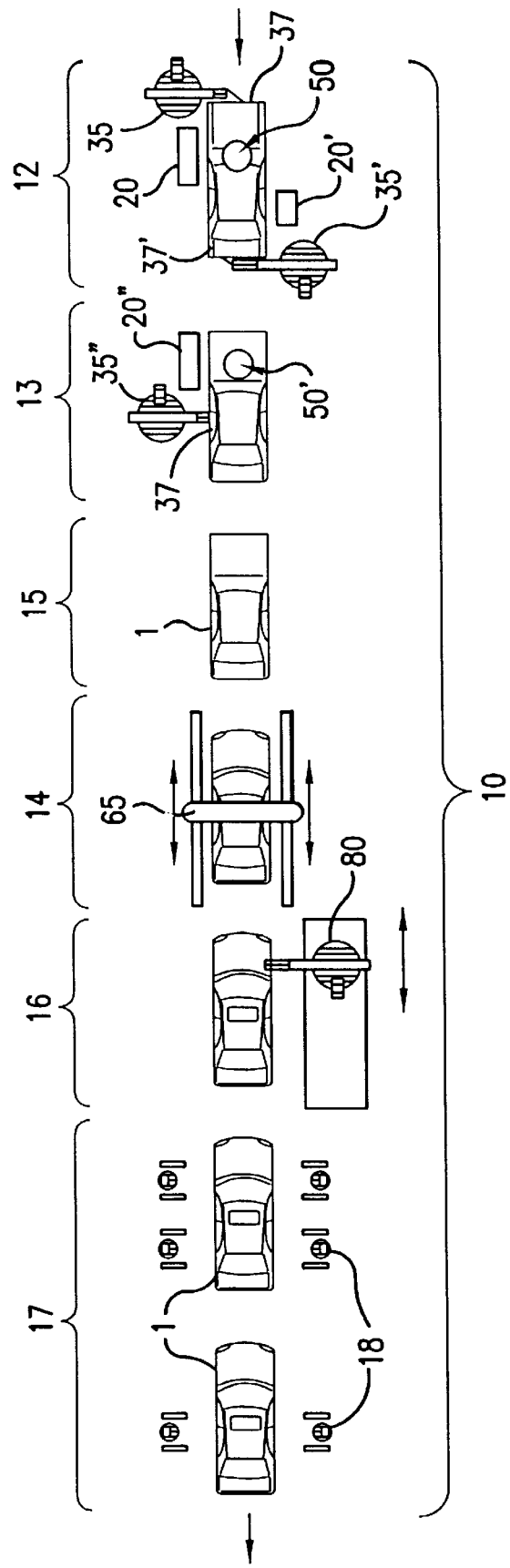
FIG. 1 shows a top view of the layout of a production line for the automated standard gluing of passenger cars with sheeting.

The production line 10, illustrated in FIG. 1, for the automated standard gluing of passenger cars with sheeting has a plurality of workstations 12 to 17 which are interlinked for transport purposes, and through which the bodies 1 to be glued with sheeting and fastened in a specific position on conveying carriages 11 are conveyed intermittently. In the individual workstations 12, 13, 14 and 16, in which (FIG. 2) work is carried out automatically, the bodies are fixed in a specific position, within a definite tolerance range, indirectly via the conveying carriages and fixing devices provided in the stations. Located between the latter stations are other workstations at which work is performed manually, so that there is no need for specific fixing in position. The individual work stations are located at a distance from one another which corresponds to the length of a body plus latitude of movement and a safety range.

Figure 2:
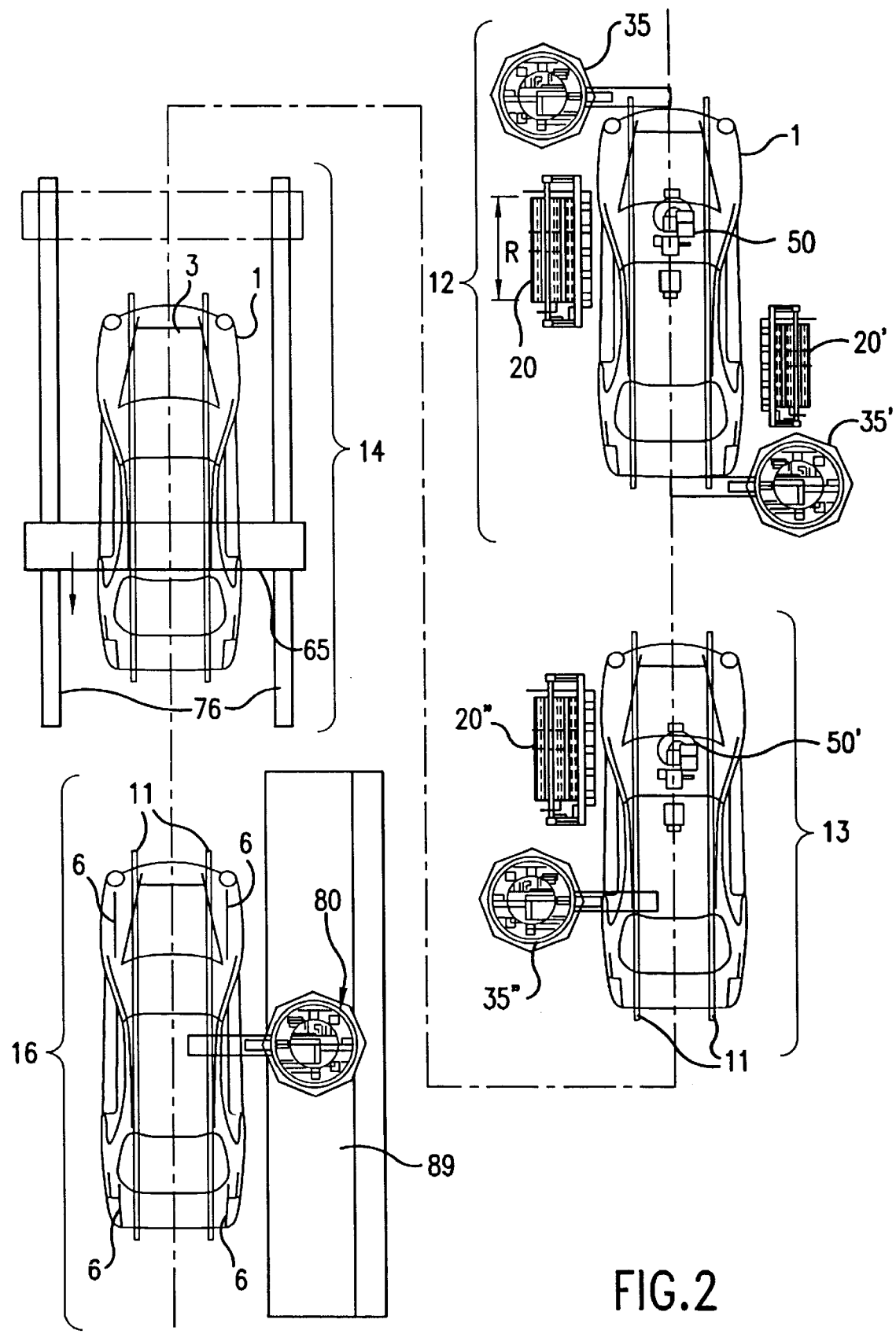
FIG. 2 likewise shows a top view of an enlarged detail of essential workstations of the production line according to FIG. 1.

The hatchback body contains a plurality of horizontal surface parts, namely an engine bonnet 3 together with adjacent parts of the mudguards, a rear lid 4, likewise together with adjacent mudguard regions, and the roof 5. The protective sheeting 23 to be applied thereto is stored in stock rolls 21 of differing width R which are held in corresponding roll stands 20, 20', 20" in a manner appropriate for processing (FIGS. 1, 2). In the horizontally stored stock roll 21, the non-adhesive side 24 faces outwards. After the protective sheeting drawn off from the stock roll has been deflected via a small movably mounted deflecting roller—jockey roller 22—, the protective sheeting is guided to a suction bar 27, on which the sheeting end 26 is held on the non-adhesive side, with the adhesive side 25 facing downwards. (See FIG. 3.)

For various reasons, the protective sheeting is statically charged to a greater or lesser extent, thus disrupting automated processing and sheeting application. The protective sheeting is therefore treated antistatically when it is being drawn off from the stock roll. This can be carried out by means of a grounded contact rod which is made of material having high electrical conductivity and which rests against the non-adhesive side transversely over the entire sheeting width. So that even relatively strong electrical charges can be removed quickly from the protective sheeting, ionized air, which compensates the charge of the protective sheeting, may be blown onto the is sheeting.

According to experience, within the composite structure of the stock roll the inner layers adhere more firmly to one another than do the outer roll layers, which increases the draw-off tension when the stock roll becomes smaller. On the other hand, however, the protective sheeting is to be received into the tentering frame with uniform sheeting tension. The jockey roller 22 is provided to compensate any such disturbing influences. It is mounted radially moveably relative to the stock roll 21 on a rocker 31 and can pressed onto the circumference of the stock roll with adjustable force by means of a pressure cylinder 32. Moreover, the jockey roller 22 may be braked by means of a brake (not shown) with an adjustable braking moment. Such a brake may be accommodated inside the jockey roller (for example as a multiple-disk brake capable of being acted on axially or as a cone brake). By virtue of the adjustable force with which the jockey roller is pressed onto the stock roll, on the one hand, and the moment with which the said jockey roller is braked, on the other hand, a uniformly high drawing-off force and therefore a uniform transfer tension in the protective sheeting, may be ensured, irrespective of changes in the diameter and the layer adhesion of the stock roll. Good preconditions for a constant result in the application of the protective sheeting may thereby be afforded.

There is also another possible manner of generating a uniform tensile stress in the sheeting as it is received into the tentering frame. According to this method, before the sheeting is received by the trailing suction bar 39 of the tentering frame 37, the holding bar 27 on the sheeting provision holding device is once again a vacuum and the sheeting retained on it. A specific tension may be built up in the sheeting by moving the tentering frame 37 a definite short distance further in the drawing-off direction a. Only thereafter is the vacuum in the trailing suction bar of the tentering frame fixed on and the sheeting thereby received with the specific tensile stress into the tentering frame.

The size of the stock rolls is advantageously selected to accommodate one complete work shift, so that only one roll change is necessary for each shift. Moreover, an apparatus is also provided for an automatic roll change, so that when the last sheeting piece from the old stock roll is consumed, the new stock roll (kept in reserve) is automatically put to use and its leading sheeting end is laid onto the suction bar 27. However, such a roll-changing device is not shown in the exemplary embodiment illustrated. It will therefore merely be mentioned that, instead of the stationary individual mounting of one stock roll 21, a centrally mounted rocker is provided on each of the two sides in the roll stand, a stock roll being held rotatably on the ends of the said rockers in each case. Of these two stock rolls, one is positioned for use, as illustrated in the example, whereas the other stock roll is kept in reserve, moved away by the amount of the rocker length. Furthermore, in the apparatus for an automated transfer of the sheeting end onto the suction bar 27, it is necessary to provide a yoke which co-oscillates with the rocker and which extends with a rod over and beyond the roll width. To prepare for an automatic roll change, the sheeting end must be laid manually with the adhesive side of the protective sheeting onto this rod. During the roll change, this yoke is then pivoted onto the suction bar 27 from below, the latter receiving the sheeting end of the new stock roll.

Depending on the production figures for each shift and depending on the cycle time during the application of sheeting, stock rolls sufficient for one work shift are so heavy that they should no longer be deposited or handled on their outer circumference, because the sheetings would otherwise acquire drag marks and the rolls flat places which would be detrimental to proper processing. Instead, sheeting rolls of this weight or diameter (the sheeting width has no critical influence here) must always be picked up in the centre by means of a special appliance and be mounted in separate frameworks. For this purpose, the rolls must be delivered with a metal winding mandrel which remains on the roll from its production until it is consumed and which has to be returned to the manufacturer after consumption.

The roll stands are arranged in the two sheeting glue-on stations 12 and 13 for the engine bonnet and rear lid and for the roof respectively. Furthermore, for each surface part 3, 4, 5 to be glued with sheeting, there is provided in each case a tentering-frame robot 35, 35', 35" which has the usual six axes of movement and which is freely programmable. The roll stand 20 and tentering-frame robot 35 for the engine bonnet 3, on the one hand, and the roll stand 20' and tentering-frame robot 35' for the rear lid 4, on the other hand, are arranged in the same workstation 12. A separate workstation 13 is provided for applying sheeting to the roof S. A freely programmable, preferably six-axis perforating robot 50 or 50' is also arranged at each sheeting glue-on workstation 12 or 13. Specifically, for reasons of space, these robots are arranged above the vehicle body 1 in such a way that the working space of the perforating robot comes to rest approximately centrally in the workstation. For this purpose, the perforating robot may be mounted or suspended on the ceiling structure of the workshop or on a gantry, or it may be held laterally, wall-mounted on a vertical mounting surface, for example on the wall of the workshop, on a pylon projecting upwards from the workshop floor or on a bracket fastened to the workshop ceiling or workshop wall.

Figure 5:
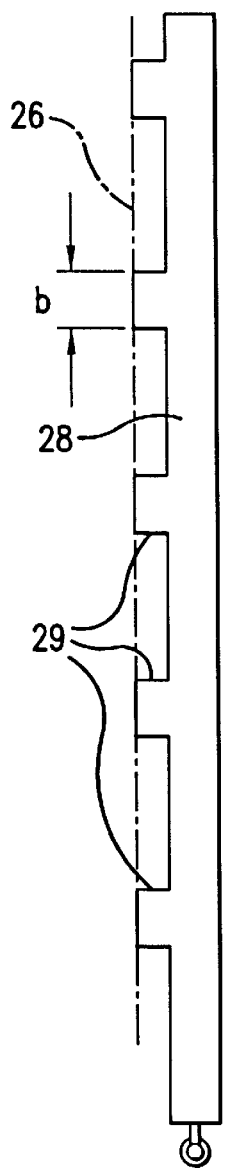
FIG. 5 shows an individual illustration of a suction bar from the apparatus according to FIG. 3 or 4 for retention of the leading sheeting end, in a view in the direction of the normally lower suction-active side of the suction bar.

On the roll stands, the leading end 26 of the protective sheeting 23 is retained and provided in specific position, so as to be free of creases, by the suction bar 27, in such a way that the sheeting end is accessible, at least in regions, on the non-adhesive side 24. (See FIG. 3.) The stand-side suction bar is perforated on its underside 28 (FIG. 5) and can be subjected to a vacuum, so as to have a suction effect, or even ventilated, so that the adhesive effect of the suction bar can be cancelled, as required, and in a time-controlled manner. That boundary edge of the suction bar which faces the drawing-off direction a for the sheeting has a crenellated contour, with the projections 29 also being perforated on the underside so as to have a suction effect. As a result, the end of the protective sheeting 26 can be retained securely, while at the same time it is nevertheless accessible on the top side in the region between the projections 29.

Furthermore, a device 30 for cutting off drawn-off protective sheeting at right angles is provided in the immediate vicinity of the suction bar 27. This cutting-off device consists essentially of a guide bar which runs transversely relative to the sheeting web and in which a knife is mechanically guided and driven, for example by means of a pneumatic cylinder via a rope pull. By means of a once-only transverse movement of the knife in the guide bar, a drawn-off sheeting piece is reliably severed from the stock at the suction bar. Because the protective sheeting must be severed with low cutting force, that is to say without the risk of creasing, knife wear must be taken into account. For this reason, a simple and rapid knife change must be ensured by means of an appropriate structural arrangement. An automatable knife change or a knife with increased service life due to a better knife material and/or due to a displaceable blade with an increased wear reserve (displaceable long blade or rotatable circular knife) could also be advantageous.

The tentering-frame robot 35, 35', 35" (FIGS. 1, 2 and 9) in each case carry, on their working arms 36, 36', 36", a rectangular tentering frame 37 which is coordinated with the size of the surface part 3, 4, 5 to be glued with sheeting. As shown in FIG. 10 suction bars 38, 39 for the retention of a sheeting blank 44 are arranged on two opposite longitudinal sides, specifically a leading suction bar 38 and a trailing suction bar 39. Individual suction bars can be switched on or ventilated via separate vacuum conduits 46 and 46'.

That suction bar 38 of the tentering frame which leads in the drawing-off direction a likewise has, on the longitudinal side facing away from the frame interior, a crenellated contour which matches (complements) the crenellated contour of the stand-side suction bar 27. Specifically, the projections 40 of the tentering-frame suction bar 38 can penetrate between the spaces of the stand-side suction bar 27 until they come into contact with the protective sheeting 23. On the leading suction bar 38, only the end faces 41 of the projections are perforated and capable of being subjected to a vacuum so as to have a suction effect. During the reception of the sheeting, the end faces of these frame-side projections are lowered between the projections of the stand-side suction bar 27 and brought into contact with the accessible regions of the sheeting end 26, so that the sheeting end provided is received by the tentering frame 37.

Figure 4:
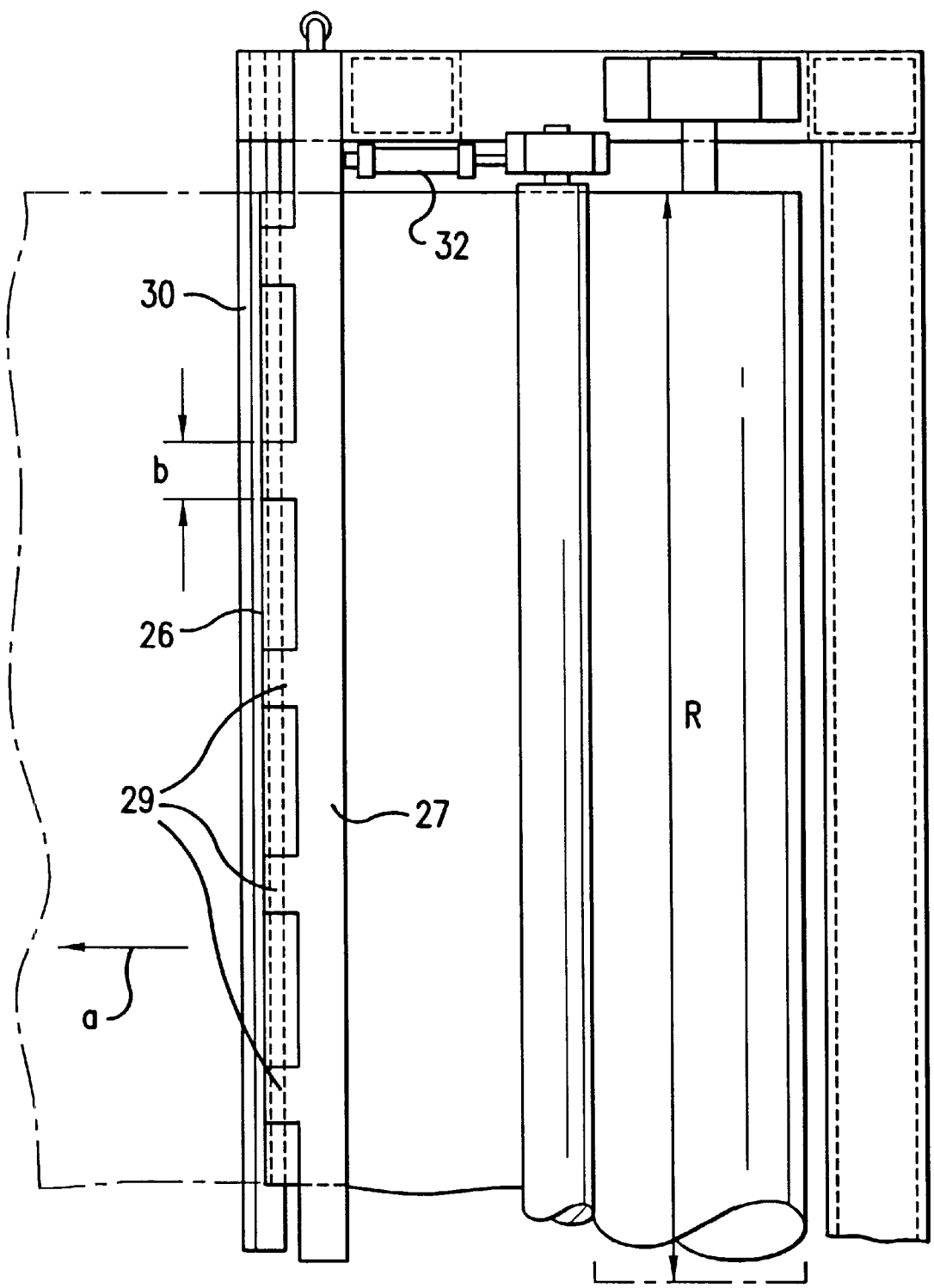

As shown in FIG. 4, the projections 29 of the stand-side suction bar 27 are narrower (width b) than the projections 40 of the tentering-frame suction bar 38 which are designed with a width B (FIG. 10). The narrow projections merely need to retain the sheeting end so as to be free of creases, whereas the wide projections 40 of the tentering-frame suction bar have to transmit the high forces with which the self-adhesive protective sheeting is drawn off from the stock roll. To increase the pneumatic holding force of the tentering-frame suction bars, the bores of the holding surfaces are countersunk with a large area on the contact side. It must be remembered, in this case, that, due to self-adhesion, the sheeting can be drawn off from the stock roll 21 only by exerting a large amount of force. So that the sheeting end, when being drawn off, can be retained securely on the tentering-frame suction bar 38, the latter is provided with pivotable gripping means 43 (FIG. 6) for the additional retention of the protective sheeting. The flap-like gripping means are driven by pivoting cylinders 49, and can pivot about a pivot axis 48, so that they can be laid under prestress onto the end face 41 of the projections 40 which is capable of being subjected to a vacuum.

To receive a sheeting blank 44 from the roll stand 20, the tentering frame 37 is placed with the leading suction bar 38 onto the protective sheeting or the stand-side suction bar 27 transversely relative to the protective sheeting 23 (that is to say vertically in the example), in such a way that the end faces 41 of the frame-side projections 40 penetrate between the spaces of the stand-side suction bar and are laid onto the non-adhesive side 24 of the sheeting. The leading suction bar is then subjected to a vacuum and the gripping means 43 are closed, so that they are laid onto to the adhesive side 25 of the received sheeting end. The stand-side suction bar 27 is then ventilated, so that the sheeting end is freed. A metered length of sheeting is drawn off from the roll 21 by the parallel forward movement of the leading suction bar 38 of the tentering frame away from the stand 20 by means of the tentering-frame robot 35. At the same time, the tentering frame is pivoted into the horizontal direction, so that, towards the end of the drawing-off and pivoting movement, the trailing suction bar of the tentering frame is also laid onto the sheeting. In this state, the second frame-side suction bar 39 and the stand-side suction bar 27 are located closely next to one another. As long as the sheeting is still under the drawing-off tension, the two adjacent suction bars are subjected to a vacuum and subsequently the cutting-off device 30 is actuated, so that a sheeting blank 44 is stretched in and is received by the tentering frame 37. While the sheeting is being severed, it is retained securely by suction bars 38 and 27 on this side and that side of the cutting-off device 30, so that there is no risk of creasing due to the effect of the force of the moved sheeting severing knife. After cutting-off, a new sheeting end 26 is provided in a specific position, so as to be free of creases, at the stand-side suction bar 27 for a new instance of reception.

Under practical operating conditions, the possibility can never be ruled out completely that the tentering frame robot 35 will collide somewhere with the bulky tentering frame 37, in particular during the setting-up phase of the robot or when any maintenance work is carried out in the plant. Minor collisions are, as a rule, survived without any harm by the robot and essentially also by the tentering frame, but the tentering frame may be distorted as a result of a small collision. So that such slight deformations can be compensated, the suction bars 38 and 39 are held adjustably on the tentering frame. They can be adjusted in terms of parallelism to one another and to the desired plane of the tentering frame and, for this purpose, must be capable of being adjusted in at least two directions in space. Moreover, the flat sides of the two suction bars, which are critical for the position of the sheeting, must be capable of being set in alignment with one another; it must therefore also be possible to some extent to adjust the circumferential position. However, this type of multiple adjustability of the tentering-frame suction bars is not illustrated in the drawings. Should major damage to a tentering frame, of whatever nature or cause, ever occur, the entire tentering frame must be capable of being exchanged quickly, so that there are no long interruptions in production. It must therefore be possible for all the mechanical connections between the tentering frame and robot arm and all the conduits to be separated and closed again quickly. Of course, in the event of such damage or repair, a proper tentering frame with all accessories must be provided in a specific position in the access region of the tentering-frame robot.

So that, towards the end of the phase of transfer of the sheeting blank from the tentering frame onto the curved body surface, the mechanical tension in the sheeting does not become too great and the risk that the sheeting will tear along the perforation lines is avoided, provision is made for sheeting edge to slide down out of the device holding it. In the case of the suction bars 38 and 39, this is achieved by a stepped reduction in the vacuum having an adhesive effect. Specifically, the suction chambers of the suction bars are ventilated only partially via a bypass conduit capable of being opened in due time, but still remain connected to the vacuum source, so that external air is snuffled in and a vacuum value with reduced adhesive effect is established in the suction bar. By the appropriate dimensioning of the bypass cross-section, the adhesive effect in the sheeting transfer phase may be influenced in such a way that the sheeting edge slides down from the suction bar, whilst a still acceptable sheeting tension is maintained.

The perforating robots 50, 50', arranged with their working space approximately centrally of and above the body in the sheeting glue-on stations 12 and 13, carry, on the working arm 51 (FIG. 9), a perforating tool (52), by means of which tear-off lines 45, 45', 45" (FIG. 10) are to be perforated in the sheeting piece 44 held, stretched out, by the tentering-frame robot. For this purpose, the perforating tool 52 has at least one circular, freely rotatably mounted serrated disk 55 which is toothed on its outer circumference and is made of metal, preferably of a corrosion-resistant steel, with a thickness of about 0.5 to 1 mm. The toothed outer circumference of the serrated disk projects between sliding runners 56 which are held in a thermally insulated manner and which, during the perforation of the protective sheeting 44, slide along on the latter and limit the depth of penetration T of the serrated disk into the protective sheeting. (See FIG. 12)

Figure 11:
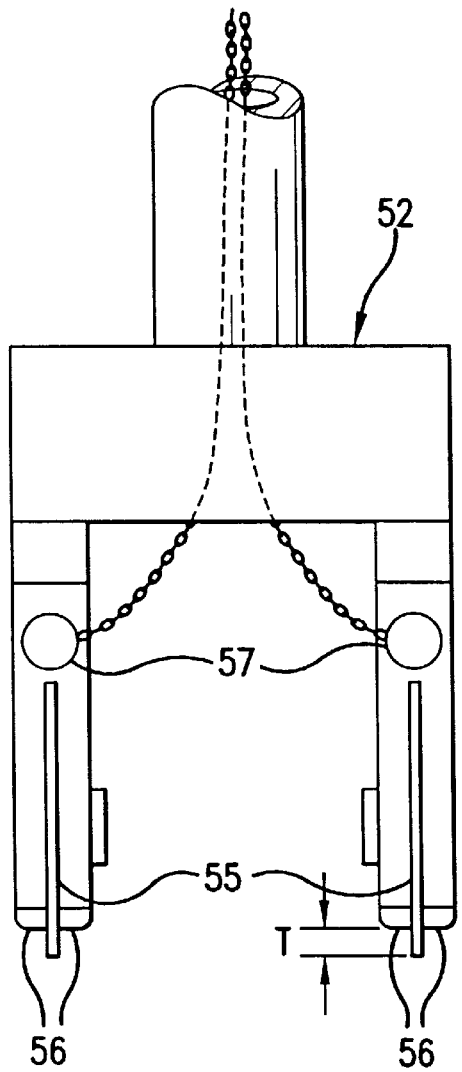
FIGS. 11 and 12 show two different side views of a tandem perforating tool, by means of which two equidistant perforation lines can be made simultaneously in the protective sheeting provided in a stretched-out manner.

In the remaining region, the serrated disk is surrounded with slight axial play by heat-conducting and heated material of the perforating tool, so that heat energy can be transmitted into the serrated disk via these zones. As shown in FIG. 11, in the region located behind the serrated disk, a heating device 57 in the form of a heating cartridge for heating the serrated disk to an exact temperature in a controlled manner is arranged in the perforating tool. For example, the serrated disk is to be heated to a constant temperature in the range of 120 to 180° C. with a temperature fluctuation of ±2°. The optimum magnitude of the temperature of the serrated disk depends on the sheeting— type of material, sheeting thickness—and on the working speed and must be optimized empirically in each particular case. In the exemplary embodiment according to FIGS. 10 and 11, the perforating tool is designed as a tandem tool with two serrated disks arranged next to one another in parallel. Two equidistant perforation lines 45, 45' can consequently be made simultaneously in the protective sheeting.

Figure 13:
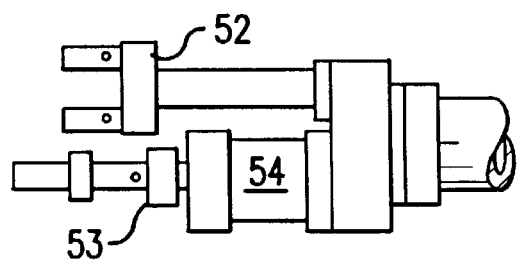
FIG. 13 shows a double tool for perforating double or single perforation lines.

FIG. 13 shows a multiple perforating arrangement with a single perforating tool 53 and a tandem perforating tool 52. The tools 52 and 53 may be brought into the operative position alternately and selectively, so that an individual perforation line 45" or two equidistant perforation lines 45, 45' simultaneously can be selectively made in the protective sheeting. The single perforating tool 53 can be advanced in front of the tandem tool 52 by means of a lifting cylinder, so that it assumes the position indicated by dot-and-dash lines, and the tandem tool 52 takes effect in the retracted position represented by unbroken lines.

Figure 12:
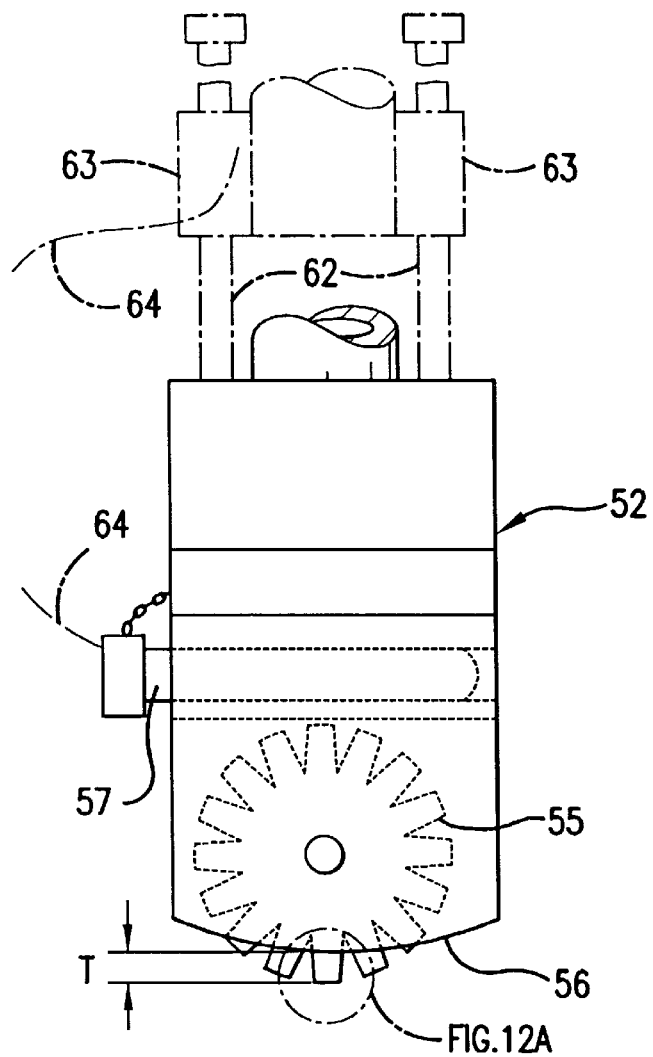
Figure 12A:
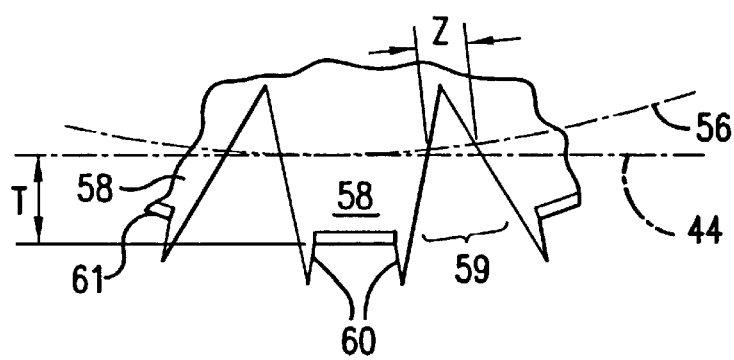

It is even expedient, as early as at the tandem perforating tool according to FIGS. 11 and 12, to mount one of the two serrated disks so as to be displaceable between two end positions, according to the example of FIG. 13. In one end position the two serrated wheels and associated sliding runners are located in the same position, and in the other end position the serrated wheels are offset in height relative to one another. In the setting with serrated wheels in the same position, two equidistant perforation lines can be drawn simultaneously, whereas, when the serrated wheels are set with a height offset, only the serrated wheel which is exposed takes effect; single perforation lines can be made in this setting. The advantage of a perforating tool designed in this way is not only a reduced outlay in terms of construction, but, above all, a compact design, which is particularly important in the case of the near-edge perforation of the sheeting blanks stretched out within a tentering frame.

So that the distance between a pair of equidistant perforation lines can be set by means of the tandem perforating tool, it is expedient if the mounting of at least one of the two serrated disks 55 can be fixed in positions of different distances from the other serrated disk in the tandem tool. This may be carried out, for example, by means of shims or by a screw connection using long holes.

For perforating the tear-off lines, the sheeting pieces may be held in a tentering frame in any desired position; that is to say horizontally, vertically or even at an inclination. The horizontal arrangement, as shown in the exemplary embodiment, of the sheeting during perforation is not only space-saving, because it allows perforation in a region, which otherwise cannot be used, above the body, but it also affords the possibility of a simple compensation of the sheeting sag under the effect of the perforating forces, in particular due to the influence of gravity. The sag of the sheeting stretched out in the tentering frame which is due to its own weight is virtually negligible. A shift of the stretched sheeting due to the force of the perforating operation presents more of a problem. Such shift, which is referred to herein simply (albeit not entirely correctly) as "sag", occurs in approximately the same amount for each position of the sheeting in relation to the direction of gravity under preconditions which are otherwise identical. Moreover, the amount of this sag depends on the size of the sheeting piece, on the sheeting tension, on the elasticity of the sheeting and on the respective position within the sheeting at which perforation is to take place.

One possible way to solve the problem of sag compensation, would be to take it into account in the robot control; but this would make the robot programming highly complicated. For simplification, a constant sag could be assumed for all sheeting sizes and, above all, for all positions, but this would lead, during perforation, to very high stress on the sheeting in the near-edge region. Expediently, in this respect, a device for compensating the sag is integrated in the perforating tool, indicated in FIG. 12 of the drawing by dot-and-dash lines. The perforating tool is provided with a compensating guide which, in the working position of the perforating tool, allows a movement relative to the end of the robot arm (that is, relative to the robot hand). Such movement is directed transversely to the sheeting surface, so that the perforating tool can "jockey" freely transversely to the sheeting. Furthermore, the compensation device comprises a drive mechanism, by means of which the movably guided part of the perforating tool can be tensioned with specific force in the direction of the sheeting.

As shown in FIG. 12, the jockey guide directed transversely relative to the sheeting could be brought about, for example, by a rod guide with two guide rods 62 which are arranged parallel to one another and which, used for the perforating tool according to FIGS. 11 and 12, would project rearward from the heatable block carrying the serrated disk 55 and which would have to be guided with ease of movement, but in tilt-proof manner, in corresponding guide bushes 63 in the rear part of the perforating tool. It would be important, in this case, that the connection for supplying the heating cartridge with electrical energy should likewise be capable of easy movement; this can be achieved, for example, by using thin-wire cords with slightly flexible insulation looped in broad arc 64. At the rearward end of the guide rods which projects out of the guide bores, stops are mounted for limiting the stroke of the moveable part of the perforating tool; it should not be allowed to fall out of the guide.

In the simplest case, namely when the sheeting is arranged horizontally during perforation, the drive mechanism for pressing down the moveable part of the perforating tool onto the sheeting may be obtained by appropriately dimensioning the weight of the moveable part of the perforating tool. Should the necessary pressure force already be exceeded by the deadweight of all the parts which are in any case required, relief may be achieved by means of at least one tension spring which has a very flat spring characteristic and which is stretched out, parallel to and symmetrically to the guide rods, between that part of the perforating tool which is guided in a jockeying manner and the tool parts assigned immovably to the robot hand. In a likewise simple way, the force required for pressing the moveable part of the perforating tool onto the sheeting may be generated by means of one or more springs directed towards the sheeting and having a very flat spring characteristic. In a more complicated arrangement which can be time-controlled and constant without any dependence on distance, the pressure force may be exerted by a preferably pneumatically loadable working cylinder.

As regards the thermal-mechanical perforating tools shown in the exemplary embodiments, a rotatable serrated disk 55 is provided as an essential perforating member. This serrated disk is passive, (non-driven) so that it rolls, as it were, on the sheeting during the perforating operation. The perforating tool is moved over the stretched-out sheeting in the direction of the perforation line positively, that is to say by means of the robot hand. In specific instances, it may be perfectly appropriate to reverse these conditions kinematically and to provide the serrated disk with a drive and guide the perforating tool along an easy-moving "passive" mechanical guide provided, the perforating tool being driven by the serrated disk. There may be provided as a guide, for example, a pair of parallel, freely stretched-out guide wires (rope-way principal) or a guide rail in the manner of a small overhead monorail which follows the desired profile of the perforation line.

Due to frequent appreciable temperature fluctuations of the heated perforating tool (heating when work commences, cooling when work is interrupted), there is a risk that screw connections on this tool will come loose, thus resulting in faults. The screw connections in the region of the perforating tool must therefore be designed with temperature stability or be secured against thermally induced loosening. Alternatively, the workpiece division and the screw connections must, insofar as possible by virtue of construction, be shifted into a region in which heating of the perforating tool does not occur or occurs only to a reduced extent.

So that, in the event of any damage to a perforating tool, it is nevertheless possible quickly to continue working, the connections of the tool 52 to the robot arm 51 are designed in a simple way and are optimized for rapid release and mounting. The same also applies to the conduit connections to the tools, which are designed as plug connections. Of course, at least one intact perforating tool must be kept in reserve, within reach, for each perforating robot.

Since both the perforating robot 50 and the cutting-open robot 80 execute spatially complicated movements and pronounced arm and hand rotations, the conduits leading to the robot tools are subjected to high stress. In order to minimize the risk of a conduit defect, it is expedient to provide for the individual conduits, at the points of articulation, rotary transmitters, the axes of which are parallel to or concentric to the respective axes of the robot arm.

The design of the serrated circumference of the serrated disk 55 of the perforating tool is important for operationally reliable perforation of the sheeting. Specifically, a plurality of teeth 58 having a circumferential extent of about 3 to 8 mm are affixed to the circumference of the serrated disk and are spaced from one another by means of deeply indented tooth spaces 59. The tooth spaces are set back behind the sliding runners 56 of the tool. As a result, only the teeth 58 penetrate with a perforating effect into the protective sheeting. A pointed spike 60 having a radial extent of at least about 2 mm is formed in each case on the front and the rear end of each tooth 58 of the serrated disk, and the tooth back located between the two spikes of a tooth is provided in each case with a cutter-like sharpening 61, at least when thicker serrated disks having a thickness of more than about 0.8 mm are used. Sharpening may be dispensed with in the case of a blade thickness of about 0.5 mm or 0.6 mm. The width Z of the tooth spaces 59 on the circumference of the serrated disk at a point level with the sliding runners is about 1 to 3 mm. This dimension determines the length of the remaining residual cross-sections in the perforated sheeting. This dimension can be optimized in a known manner in each particular case by means of tests. On the one hand, the residual cross-sections remaining after perforation should not be too small, so that the perforated sheeting can still be processed reliably (that is, perforated further, and also handled reliably). On the other hand, the residual cross-sections should be small enough to ensure that the sheeting pieces to be removed as a consequence of assembly can also be reliably torn off along the perforation lines, without the remaining sheeting coming loose from the body or tearing during the tearing-off operation.

For perforating contour lines closed on themselves, in particular of small dimension, for example circles, rectangles or the like, likewise heatable perforating punches of crown-like shape may also be used. Their serrated ring is expediently shaped in a similar way to the serrated disk 55, but the serrations all extend parallel to the pricking direction. The serrated ring is surrounded, at least on the outside, by a stop ring which remains cold and which is set back by a specific amount relative to the tips of the serrations, so that it limits the depths of penetration of the serrated ring into the sheeting. Thus, it fixes the degree of perforation. Instances of the use of such contour lines closed on themselves are cutouts for local accessory parts, such as aerials, washing-water nozzles, company badges, door handles, ventilation louvres or the like.

The closed contour line may, under some circumstances, attain a relatively long extended length, for example because the accessory part in which a clearance has to made is relatively large or if the contour line has a complicated profile. Over and above a specific extended length of the contour line, the forces required for pressing a crown-like perforating punch into the sheeting with a perforating effect are dangerously high, so that there is the risk that other perforation lines already made will tear, or that the sheeting will, at least partially, come loose in an uncontrolled manner at the edge chucking. It may therefore be expedient to produce contour lines of relatively long extended length, of the type mentioned, in steps by means of a plurality of different perforating punches, each of the perforating punches perforating only a part circumference of the entire contour line. In this case, it is also expedient to provide as perforating punches certain basic geometrical elements, such as a straight line, a semicircle, a quarter arc, a sharp-edged right angle and special shapes. By virtue of the star-shaped arrangement of these various perforating punches on a multiple tool, in a similar way to the principal of a type wheel on electrical typewriters, any desired contours may then be perforated universally. As a rule, however, attempts will be made to avoid this method of perforation, because the successive perforation of small length portions is time-consuming and is justified only if it is absolutely necessary.

Another possibility for avoiding unacceptably high stress on the sheeting when perforating punches are being pressed in is to suck up the sheeting onto the perforating punch during the pricking action. For this purpose, the region surrounded by the serrated ring of the perforating punch is provided with a vacuum connection for initiating a low vacuum in the manner of a vacuum cleaner. In order to draw the perforating punch out of the sheeting after perforation, the previously partly evacuated region must be brought at least to atmospheric pressure again as quickly as possible. It is preferable to introduce even slight overpressure into the region surrounded by the serrated ring, so that the sheeting is pressed down pneumatically by the perforating punch.

The purpose of the perforation lines is, of course, to facilitate removal of specific sheeting portions in the region of accessory parts along the tear-off lines thus provided. Relatively large sheeting portions should be torn off only after the perforated sheeting has been applied to the vehicle body, since any attempt to remove relatively large sheeting portions even before application can result inn loss of the cohesion of the sheeting and its handleability. By contrast, the situation is different in the case of relatively small sheeting portions divided off by means of perforation line closed on itself. The latter may be removed even before application, without impairing the stability or handlability of the perforated sheeting. Prior removal of the pricked-out sheeting portion in the course of the perforating operation is particularly advantageous here. Indeed, the subsequent removal of relatively small sheeting portions, divided off by means of a perforation line closed on itself, from the already applied sheeting is particularly laborious and time-consuming, because the "start" of the perforation is difficult to grasp, especially since it is located on a sensitive paint surface which should not be damaged.

So that sheeting portions, which are divided off by means of a perforation line closed on itself and which have been "pricked out" by one and the same crown-like perforating punch, can be removed immediately after perforation, it is expedient for the degree of perforation to be as high as possible. It may be advantageous, in this respect, to dispense entirely with supporting residual cross-sections and to prick out the respective sheeting portion completely. The serrations, penetrating into the sheeting with a perforating effect, of a perforating punch prepared for this purpose widen towards the adjacent serrations and complete one another still within the specific depth of penetration, to form an uninterrupted separating line. It is also possible for only very small residual cross-sections to be left between adjacent perforating slits. For example, the remaining residual cross-section may be less than 5%.

So that a prick-out having such small or even no supporting cross-sections can be reliably produced out of the sheeting by means of a perforating punch, without distortion, the above-mentioned vacuum-assisted pressing of the sheeting onto the perforating punch is recommended. However, on account of the risk of clogging of the suction conduit by any torn-out sheeting portions, these must be prevented from entering the suction conduit. This can be ensured, for example, by means of a close-meshed supporting grid which fills the free area enclosed by the serrated ring, onto which the pricked-out sheeting can be laid under the effect of a vacuum. To remove the pricked-out sheeting piece from the sheeting, the perforating punch, together with the sheeting piece retained pneumatically therein, can be drawn out of the sheeting. Insofar as some residual cross-sections still remain, intentionally or unintentionally, in the region of the perforation line, these are torn through as a result of the drawing-off movement of the perforating punch. The pricked-out sheeting piece remains within the perforating punch as long as the vacuum remains. In this state, the perforating punch can be brought over a collecting container and, there, the pricked-out sheeting piece can be released from the serrated ring of the perforating punch by means of a compressed-air pulse and thrown into the collecting container.

The perforating operations described hitherto take place in the sheeting glue-on stations. In the exemplary embodiment illustrated, an empty station 15 (FIG. 1), in which the application of the sheeting can be carried out manually in the event of a fault, is provided downstream of the sheeting glue-on stations 12 and 13 for safety's sake.

Figure 14:
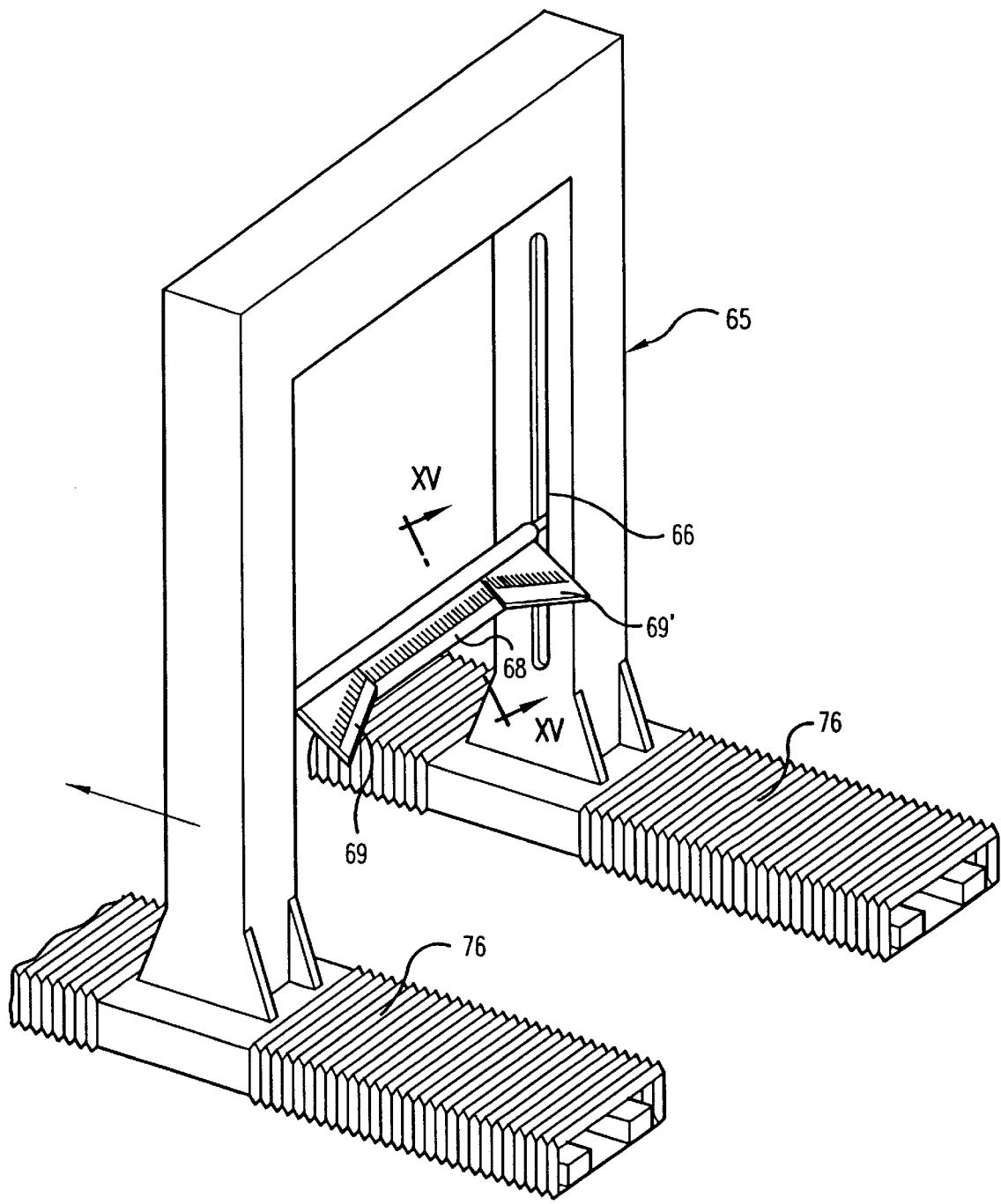
FIG. 14 shows an oblique view of a displaceable gantry passing over the body and having a vertically movable brushing bar for pressing down the applied protective sheeting.

In general, sheeting application is followed by the press-on station 14, in which the perforated protective sheeting pieces applied to the vehicle body loosely, but so as to be free of creases, are pressed jointly onto the surface parts, to improve their adhesion. For this purpose, as shown in FIG. 14, a gantry 65, which spans the vehicle body is provided in the press on station 14, and displaceable in the longitudinal direction of the vehicle body on a floor guide 76 equipped with a corresponding drive. An elastic and slidable brushing bar 67, having a shape which is adapted approximately to the corss-sectional contour of the surface parts to be glued over, extends horizontally over the entire vehicle width within the orifice of the gantry. For contour adaptation, the brushing bar is composed of a rectilinear middle bar portion 68 and of two lateral bar portions 69 and 69' arranged at a mirror-symmetrical inclination. The brushing bar 67 is movable up and down in a vertical guide 66 in a manner which prevents tilting from right to left; at the same time it maintains its inclination relative to the longitudinal axis of the vehicle (see FIG. 15, described below). Moreover, the gantry is equipped with a lifting drive for the brushing bar, by means of which the brushing bar can be raised and carefully lowered onto the body. In the state in which it is lowered onto the body, the brushing bar rests loosely, with a definite force, on the vehicle body at any height and consequently presses the sheetings onto the body. This pressure force occurs as a consequence of gravity by virtue of the deadweight of the brushing bar and by virtue of any additional weights accommodated in the vertical guide. The brushing bar can follow the longitudinal contour of the body without any constraint when the gantry travels along over the body.

In the exemplary embodiment illustrated in FIG. 15, the supporting part of the brushing bar is formed by an angle profile 70, to which a stiff felt strip 73 having a thickness of about 15 mm and a width of about 20 cm is screwed. On the topside, in order to stiffen the felt, a plastic bar 74 made of a fibre-reinforced elastic plastic is inserted between the angle profile 70 and the felt strip 73, the exposed side of the plastic bar being serrated in a comb-like manner by means of a multiplicity of closely adjacent indentations 75 and thereby being reduced in resilience at the exposed edge. Moreover, the brushing bar can thereby be distorted more easily in space and thus adapt more easily to different body contours.

For pressing down the protective sheeting, the gantry 65 starts at the front initial position indicated by dot-and-dash lines in FIG. 2. There, the brushing bar is lowered at the front onto the body and the gantry travels rearwards in the longitudinal direction, together with the weighted brushing bar resting loosely on the body, over and beyond the fixedly held body and thus presses down the loosely applied protective sheeting. When the end of the engine bonnet is reached, the gantry raises the brushing bar to roof level and carefully lowers it again at the start of the roof; the pressing-on operation is continued on the roof sheeting. At the transition from the roof to the rear lid, the brushing bar is once again carefully transposed and the pressing-on operation is also continued there. Towards the end of the rear lid, the brushing bar is raised completely and, with the brushing bar raised, the gantry travels back into the front initial position indicated by dot-and-dash lines and waits there, with the brushing bar raised, for the next vehicle body.

Instead of the procedure just described, kinematic reversal is also quite possible, in which the gantry, together with the vertically movable brushing bar, is arranged at a fixed location and the vehicle body is slowly moved through the gantry by means of a conveying apparatus which, for example, is integrated in the floor. This arrangement would have the advantage that the conveying apparatus would be simpler than the longitudinal guide for the longitudinally movable gantry just described. A disadvantage, however, would be the larger space requirement for a press-on station designed in this way where the bodies are glued with sheeting at a standstill in the sheeting glue-on stations. Also, after the protective sheeting has been applied to the body, it will be desirable to make the sheeting glue-on stations free for a new body as quickly as possible. However, if the protective sheeting is to be laid on in the sheeting glue-on stations in the course of a slow body run-through, this body movement, also carried on continuously in the press-on station, can also be utilized for pressing down the sheeting underneath the fixed gantry. The space requirement of the press-on station would correspond merely to the space requirement of the gantry plus some maintenance and safety distance. The same would also apply in the event that there is no need for clearing the sheeting glue-on stations as quickly as possible after the protective sheeting has been applied to the body. This possibility may arise, for example, when only small quantities of vehicle bodies are to be glued with protective sheeting per unit time on an installed application line.

In such a case, it is also possible to press protective sheeting down by means of the respective tentering-frame robot which laid a sheeting piece onto the body. In such a case, a separate press-on station could be dispensed with completely. So that the laid-on protective sheeting can be pressed down by the respective tentering-frame robot, the tentering frame would be provided with a movable brushing bar which, during the handling of the sheeting piece, is retracted into a rest position located above the tentering frame and which, in order to press down the sheeting, can be brought into a working position located below the tentering frame. In the case of this double function of the tentering-frame robots for laying on the sheeting and for pressing down the sheeting, it is basically conceivable to ve two different modes of operation for pressing down the sheeting which differ from one another in kinematic reversal. In one case, the body also dwells at a fixed location during the pressing down of the sheeting and the brushing bar integrated on the tentering frame is brushed by the tentering-frame robot over and beyond the sheeting piece laid on the respective part surface of the body. The other possibility is for the brushing bar and the tentering frame to dwell at a fixed location during the pressing down of the sheeting and for the body to be moved slowly through, under the brushing bar. In these two modes of operation, it is conceivable, on the one hand, that each individual sheeting portion also be pressed down by the respective tentering-frame robot immediately after the respective operation of laying on the sheeting. Alternatively, it is possible, on the other hand, that only that tentering-frame robot which lays on the last sheeting portion subsequently presses down all the sheeting pieces. The alternatives discussed here for pressing down the sheeting are not illustrated in the drawing.

Provided downstream of the press-on station 14 is a cutting-open station 16, in which glued-over gaps 6 between movable body parts can be cut free automatically. Arranged in this station is a freely programmable industrial robot (cutting-open robot 80) with six degrees of freedom for the robot arm 81 and with a further seventh axis of movement for moving the cutting-open robot along the floor guide 89. The cutting-open robot is provided with the axis of movement 89 not only on account of the measuring function, but also on account of the glued-over gaps 6 which are located on the body at the front and rear and at which the sheeting has to be cut open.

A double tool 82/83 pivotable into different working positions is mounted on the working arm 81. When the bodies are being transferred from station to station, despite mechanical fixing of the conveying carriages at station-side lateral and longitudinal stops, the actual position of the bodies is spread within a tolerance range which is unacceptably large for cutting free the gaps. These tolerances in the position of the body also have superposed on them some inherent tolerances of the body itself which, although substantially smaller than the position tolerances, also cannot be ignored entirely, at least when the tolerances are superposed, during the cutting free of the gaps. Consequently, before the body gaps are cut free, their exact actual position in relation to the cutting-open robot must first be determined at a few body points at the front and rear. This measurement of the actual position of the gaps may be carried out by means of a stationary measuring system working three-dimensionally.

In the exemplary embodiment illustrated, this determination of the actual position of the gaps 6 is likewise carried out by the cutting-open robot 80 itself which, in this case, works as a measuring robot. That is, in one pivoting position, the tool part of the double tool which is operative is designed as a measuring tool 82, by means of which the exact actual position of the body 1 or of the gaps 6 in relation to the cutting-open robot can be recorded. In the other pivoting position of the double tool, the tool part which is operative is designed as a cutting and pressing-down tool 83 which has a knife 84 for severing the protective sheeting in the gap region and a rotating brush 87 for pressing down the cut edges. The rotating brush 87 can be driven from an electric motor 88 via a speed-reducing angular gear.

The knife 84 is elastically suspended transversely to the direction of separation and movement by means of a leaf spring 85, so that it can follow, without constraint, any deviations in the position of the gap from the guide path predetermined by the robot. On the other hand, so that the knife cannot shift laterally to an unacceptable extent, the latitude of movement is restricted by a pair of stop arms 86 engaging over the knife on both sides. The latitude of movement is predeterminable by means of adjusting screws 92. However, when the knife pricks into the gap, an unequivocal position of the knife must be ensured and the latitude of movement must be cancelled. The stop arms, pivotable about a pivot axis 91, can therefore be moved together by means of a small pneumatic cylinder 90, engaging on the opposite lever arms via a spreading wedge, and the knife can be clamped in a specific position between the said stop arms, temporarily during the pricking of the knife into a gap.

To protect the paintwork in the gap region from scratches caused by the brushing-through blade of the knife 84, the two flat sides of the blade are provided with a plastic coating preventing the hard blade material from coming into direct contact with the paintwork, although this is not illustrated in the drawing. The plastic applied to the blade on both sides should have good sliding properties in respect of cured vehicle paints and in respect of the sheeting to be applied. As regards the coating thickness and the resistance to wear of the coating plastic, the coating should attain at least the lifetime of the knife blade, even if the latter is reground more than once. For reasons of the sharpening of the blade, the plastic coating of the blade is set back relative to the cutting edge.

It may also be mentioned, in connection with the cutting tool 83, that, with a view to working efficiently, a quick change of the knife 84 must be possible here, because, on account of the long sheeting length to be cut open, these knives are subject to corresponding wear. Measures for increasing the service life are expediently employed here, too, such as a better knife material, a hard coating of the cutter or a greater wear reserve, for example by using rotatable circular knives. For the sake of completeness, it may be mentioned once again, in connection with this robot tool, that it must be exchanged quickly in the event of damage and all the connections of a mechanical, electrical or fluidic nature must be designed for a quick change. It should also be possible for the measuring tool 82 alone also to be exchanged quickly within the double tool 82/83.

Bodies of different vehicle type in the production mix may readily be glued with protective sheetings by means of the plant described, if additional minor fittings are provided for this purpose in the stations. Specifically, a type recognition facility working automatically must be installed, at least in the first work station, the said facility approaching a data carrier carried along together with the bodies and determining the body type from this. For example, this may take place by means of a barcode label carried along on the bodies and by means of a barcode reader in the entry region for the workstation. Other information carriers, too, are basically suitable for this purpose. This information may be clocked through the workline in steps along with the clocking through of the vehicle bodies from workstation to workstation. The body type located in the station in each case must be fed into the robot control of each workstation in a suitable way. Moreover, program selection for treating the different body types, which can be changed quickly and automatically, must be provided in the robot controls.

The width of the tentering frames 37, 37' and 37" does not necessarily have to be variable in order to make the production line flexible with regard to a production mix; in this respect, they may be designed for the widest body type. In the case of narrower bodies, the protective sheeting then extends into the side wall to a somewhat greater extent, which does not cause any harm. If this is to be avoided, and if sheetings of different width are used for bodies of different width, the suction bars would have to be equipped with switch-on chambers in the edge region, so that the vacuum can take effect over different widths. So that different lengths of surface parts can also be attended to with the same tentering frame, the rear suction bar of the tentering frame can expediently be moved into different positions by means of regulating cylinders, so that different frame lengths can be set.

In the case of notchback saloons, as a rule three surface parts, namely the engine bonnet 3, roof 5 and rear lid 4, which may differ in width and/or length in the case of different body types, have to be protected. Where estate cars are concerned, the roof is markedly longer, and therefore this lengthening cannot be achieved well by stretching out the tentering frame. However, since the rear lid is dispensed with on estate cars, it is appropriate, if there is a need for mixed production of estate cars, too, to glue the longer roof of estate cars in an overlapping manner with two sheeting portions, commencing from the rear in the forward direction, and, for this purpose, to use the tentering frames for the roof and rear lid for conventional notchback saloons.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for applying self-adhesive protective sheeting to surface parts of vehicle bodies, the protective sheeting being provided in at least one stock roll, said method comprising:

drawing a measured sheeting piece from the stock roll by means of an application robot;

stretching said sheeting piece so that it is free of creases and with inherent stress;

in the stretched-out state of the sheeting piece, before the application of the sheeting, forming perforation lines in a first preselected position in the sheeting piece by means of an apparatus capable of being moved in a programmed manner and carrying a perforating tool;

said robot lowering the perforated sheeting piece in a second preselected position, onto a surface part of the body; and pressing said sheeting piece down onto the said surface part so as to be free of creases and bubbles.

2. The method according to claim 1, wherein:

said measured sheeting piece is drawn from said stock roll by means of a robot-guided tensioning frame; and wherein said measured sheeting piece is stretched on said tensioning frame.

3. Method according to claim 1, further comprising:

the specifically positioned and crease-free retention and provision of a leading end of the protective sheeting, coming from the stock roll, in such a way that said leading sheeting is accessible, at least in regions thereof, on a non-adhesive side thereof;

reception of a stock-side end of the protective sheeting on said non-adhesive side by a first suction bar guided mechanically in a drawing-off direction and release of the sheeting from a provisional holding device;

drawing-off of a rectangular piece of protective sheeting, coordinated in terms of size with a vehicle body surface part to be protected, from the stock roll, a roll width of which is coordinated in each case with a side length of the vehicle body surface part and the stretching-out of the drawn-off sheeting piece while it is still adhering to the stock roll;

placement of a second suction bar at a specific distance from the first suction bar and forming with it a tentering frame, onto the non-adhesive side of the stretched-out protective sheeting;

chucking of the drawn-off sheeting piece in the tentering frame with the subsequent reception of the new stock-side sheeting end on the provisional holding device and the cutting-off of the drawn-off sheeting piece from the stock roll;

perforation of tear-off lines in a region to be provided for an accessory part, by means of a heated serrated disk, guided mechanically along preset contour lines, in the sheeting piece from the non-adhesive sheeting side, the said sheeting piece being held in a freely stretched-out manner;

alignment and lowering of the perforated sheeting piece, stretched out in the tentering frame, onto the vehicle body surface part of the vehicle body in a specific position and the laying of the sheeting piece onto the said vehicle body surface part;

subsequent pressing-down of the protective sheeting by means of a slidable and elastic brushing bar;

severing of the protective sheeting piece in a region of glued-over gaps, and pressing-down of the cut edges, by means of a pressure exerting element brush;

drawing-off of portions of said protective sheeting in said region for accessory parts along the perforated tearing lines; and making of clearances in the remaining protective sheeting piece in a manner appropriate for assembly and the disposal of these sheeting parts.

4. Method according to claim 1, wherein the protective sheeting is applied to freshly painted vehicle bodies which subsequently run to the final assembly stage.

5. Method according to claim 1, wherein the drawn-off protective sheeting, before being processed further, is treated antistatically, and is freed of any static charge.

6. Method according to claim 1, wherein the protective sheeting is drawn off from the stock roll with uniform tension, irrespective of any changes in diameter of the stock roll or fluctuations in the adhesion of the protective sheeting in the stock roll.

7. Method according to claim 1, wherein the specifically positioned and crease-free retention and provision of the leading end of the protective sheeting on its non-adhesive side, are performed by means of a switch-on and switch-off of a vacuum along a holding suction bar, a graspable edge strip of protective sheeting being allowed to project, at least in regions, beyond the holding suction bar.

8. Method according to claim 1, wherein, for stretching out and handling the sheeting blank, the tentering frame is guided by means of a freely programmable industrial robot having at least five degrees of freedom of movement.

9. Method according to claim 1, wherein the drawing-off of the protective sheeting from the fixedly held stock roll is carried out by means of the robot-controlled tentering frame, by the parallel movement of the first suction bar away from the stock roll and the provisional holding device.

10. Method according to claim 1, wherein cutting-off of the drawn-off sheeting piece from the stock roll is carried out by means of a guided knife running transversely.

11. Method according to claim 1, wherein perforation of the tear-off lines in the sheeting piece held in a freely stretched-out manner is carried out by means of a freely programmable industrial robot having at least five degrees of freedom of movement.

12. Method according to claim 1, wherein when a sheeting blank held in the tentering frame is being laid onto the associated surface part, the holding force with which the tentering frame retains the sheeting piece is reduced, so that the retained edges of the sheeting piece slide out of the edge chucking under the tension of the sheeting piece, which tension increases during the laying-on operation, as a consequence of curvature of the vehicle body surface part.

13. Method according to claim 1, further comprising:

a repetition of the method steps for the application of sheeting pieces to other surface parts to be covered, wherein all the surface parts of the body which are to be glued with sheeting are glued with protective sheeting in specific position; and pressing-down of the protective sheetings is performed thereafter by means of an elastic brushing bar which extends over the entire vehicle width and which is one and the same for all the glued-over surface parts.

14. Method according to claim 1, wherein for bodies of notchback vehicles, the protective sheeting for the engine hood and for the rear lid are applied simultaneously and in a manner offset in time relative to the application of sheeting to the roof.

15. Method according to claim 1, wherein protective sheeting is applied not only to substantially horizontally extending vehicle body surface parts of the body, but also to the side faces of doors.

16. Method according to claim 13, wherein the elastic brushing bar is slidably moved under an approximately constant pressure force in a longitudinal direction relative to the body or the body is moved forwards relative to the brushing bar.

17. Method according to claim 2, wherein severing of the protective sheeting in the region of glued-over gaps and the pressing-down of the cut edges are carried out by means of a freely programmable industrial robot having at least five degrees of freedom of movement.

18. Method according to claim 17, wherein before the protective sheeting is severed in the region of glued-over gaps and before the cut edges are pressed down, first an actual position of the gaps of the body is made within a working space of the industrial robot and a position of the gaps in relation to the industrial robot is fed into the robot control.

19. Method according to claim 2, wherein sheeting portions projecting in the region of mudguards and doors are left on the vehicle body.

20. Method according to claim 2, wherein parts of said protective sheeting parts in the region of accessory parts are drawn off manually from the bodies along the perforated tearing lines.

* * * * *